(12) United States Patent
Yanagi et al.

(10) Patent No.: US 6,952,314 B2
(45) Date of Patent: Oct. 4, 2005

(54) METHOD OF MANUFACTURING ND FILTER, AND APERTURE DEVICE AND CAMERA HAVING ND FILTER

(75) Inventors: Michio Yanagi, Saitama (JP); Fumie Ishii, Saitama (JP); Masayuki Uchiyama, Saitama (JP); Takayuki Wakabayashi, Saitama (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 3 days.

(21) Appl. No.: 10/630,888

(22) Filed: Jul. 30, 2003

(65) Prior Publication Data

US 2004/0021967 A1 Feb. 5, 2004

(30) Foreign Application Priority Data

| Jul. 30, 2002 | (JP) | ................................. | 2002-220762 |
| Jul. 30, 2002 | (JP) | ................................. | 2002-220770 |
| Jul. 30, 2002 | (JP) | ................................. | 2002-220776 |
| Sep. 24, 2002 | (JP) | ................................. | 2002-276783 |

(51) Int. Cl.$^7$ ................................................. G02B 5/22
(52) U.S. Cl. ........................ 359/888; 359/885; 359/889; 396/108
(58) Field of Search ........................ 359/888, 889, 359/885, 894; 396/108, 164, 461

(56) References Cited

U.S. PATENT DOCUMENTS

| 2,771,078 | A |   | 11/1956 | Summers et al. |
| 3,943,019 | A |   | 3/1976 | Krekeler et al. |
| 5,479,298 | A | * | 12/1995 | Yanagi et al. ............... 359/888 |
| 5,715,103 | A |   | 2/1998 | Amano et al. |
| 5,993,904 | A | * | 11/1999 | Boucher ................... 427/248.1 |
| 6,078,442 | A | * | 6/2000 | Tada et al. .................. 359/890 |
| 2002/0176183 | A1 | * | 11/2002 | Erz et al. .................... 359/885 |
| 2004/0135921 | A1 | * | 7/2004 | Murata et al. .............. 348/342 |

FOREIGN PATENT DOCUMENTS

| DE | 2147261 | * | 3/1973 | ........... G02B/55/22 |
| JP | 3-264668 |   | 11/1991 |   |
| JP | 5-281593 |   | 10/1993 |   |
| JP | 6-175193 |   | 6/1994 |   |
| JP | 7-63915 |   | 3/1995 |   |
| JP | 10-133253 |   | 5/1998 |   |
| JP | 11-38206 |   | 2/1999 |   |
| JP | 11-190886 |   | 7/1999 |   |
| JP | 2000-119846 |   | 4/2000 |   |
| JP | 2000-352736 |   | 12/2000 |   |

OTHER PUBLICATIONS

Partial English Translation of Japanese Office Action of JP Application No. 2002–220762.
Partial English Translation of Japanese Office Action of JP Application No. 2002–220770.

* cited by examiner

*Primary Examiner*—Leo Boutsikaris
(74) *Attorney, Agent, or Firm*—Morgan & Finnegan, LLP

(57) ABSTRACT

The present invention provides a method of manufacturing an ND filter having a gradation density distribution, the ND filter, and an aperture device and a camera having the ND filter. A structure thereof is as follows. The method of manufacturing an ND filter having at least two kinds of films on a substrate includes the steps of: forming a film of at least one layer other than an outermost layer having a gradation density distribution while rotating a slit mask integrally with the substrate; and forming a film of the outermost layer without using the slit mask.

12 Claims, 27 Drawing Sheets

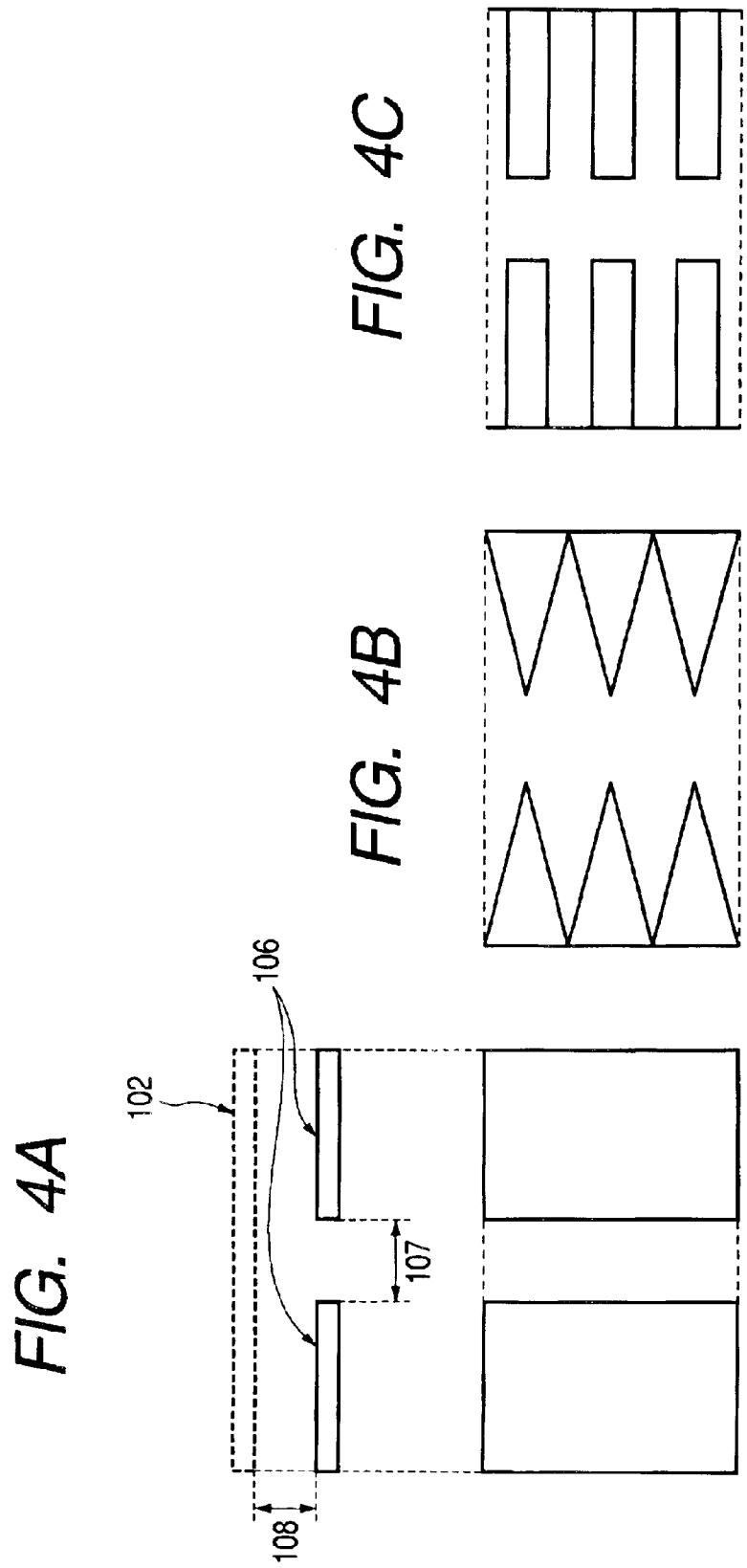

POSITION ON SUBSTRATE Δx

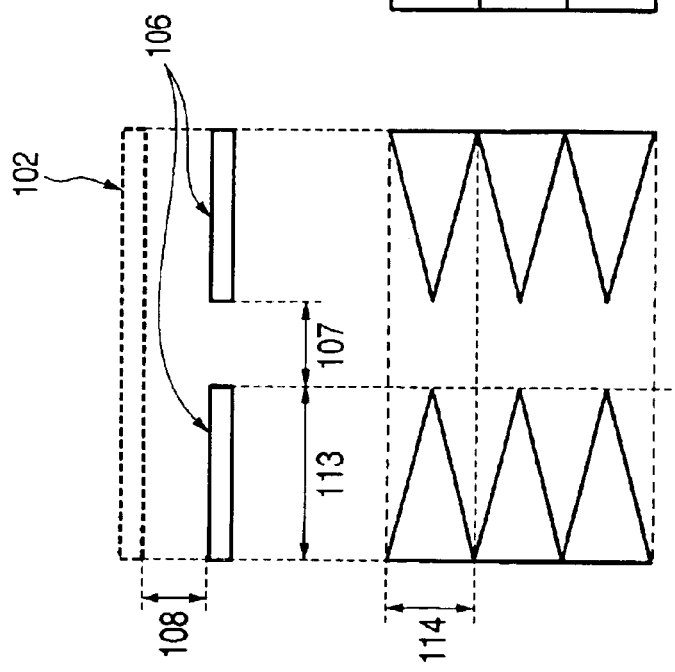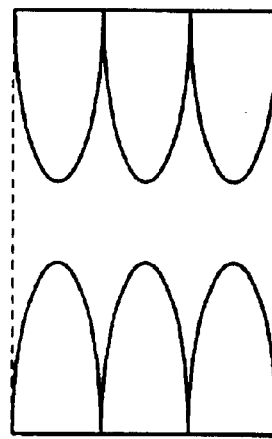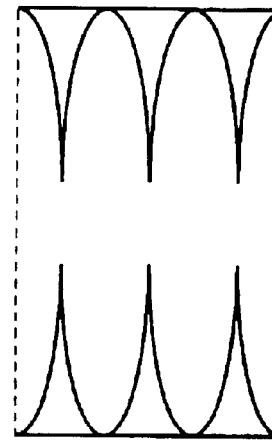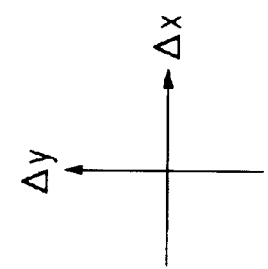
FIG. 22A  FIG. 22B  FIG. 22C

METHOD OF MANUFACTURING ND FILTER, AND APERTURE DEVICE AND CAMERA HAVING ND FILTER

BACKGROUND OF THE INVENTION

1. Field of the Invention

The present invention relates to a method of manufacturing an ND filter, the ND filter manufactured by the method, and an aperture device and a camera having the ND filter. In particular, the present invention relates to a method of manufacturing an ND filter suitable for a photographing optical system such as a video camera or a still video camera, the ND filter manufactured by the method, and an aperture device having the ND filter.

2. Related Background Art

An aperture device is arranged in an optical path of a photographing optical system in order to control the amount of light incident on a silver halide film or a solid-state image pickup element such as a CCD, and when an object field is bright, the aperture device is stopped down to have a smaller aperture size.

On a very fine day, or when a high-luminance object field is to be photographed, the aperture device is stopped down to have a small aperture size, and is easily influenced by hunting phenomenon of aperture and diffraction of light, resulting in deterioration of image quality. As a countermeasure against the deterioration, a film-like neutral density (ND) filter is attached to each aperture blade so as to increase the aperture size of the aperture device even if brightness of an object field is the same.

In recent years, the density of the ND filter is increased according to an increase in sensitivity of an image pickup element so as to further decrease a transmittance of light and increase an aperture size of the aperture device even if the brightness of the object field is the same. However, when the density of the ND filter is increased in this way, a difference is increased between the amount of light "a", which is transmitted through an ND filter, and the amount of light "b", which is not transmitted through the ND filter in a state shown in FIG. 37. Then, a "shading" phenomenon occurs, in which the brightness varies across a screen, and resolution is undesirably decreased. In order to eliminate this drawback, the ND filter must have a structure in which its density is changed so as to sequentially increase the transmittance toward a center of an optical axis.

Incidentally, FIG. 37 shows a photographing optical system having a conventional aperture device. In the figure, lenses 906A, 906B, 906C, and 906D constitute a photographing optical system 906. Reference numeral 907 denotes a solid-state image pickup element, and 908 denotes a low-pass filter. In addition, reference numerals 911 to 914 denote members constituting the aperture device; 911, an ND filter; and 912 and 913, aperture blades, which are moved to oppose to each other. Those two aperture blades are driven in a vertical direction on a paper surface of the figure and form a substantially rhombic aperture. The ND filter is adhered to the aperture blade 912. Reference numeral 914 denotes an aperture blade support plate.

In general, as a method of manufacturing an ND filter, there are a method of mixing and kneading a light absorbing organic dye or pigment in a film-like material (cellulose acetate, polyethylene terephthalate (PET), vinyl chloride, etc.), and a method of coating a light absorbing organic dye or pigment onto the material. With those manufacturing methods, a filter having a uniform density can be manufactured. However, it is very difficult to manufacture a gradation ND filter in which density changes depending upon the portion in the filter.

Concerning such a gradation ND filter (density variable ND filter), the inventors of the present invention have proposed a method of manufacturing a gradation type ND filter according to a microphotography in Japanese Patent Application Laid-Open No. 05-281593 (no corresponding US patent), U.S. Pat. No. 2,771,078, and Japanese Patent Application Laid-Open No. 06-175193 (no corresponding U.S. patent). In a video camera in those days, improvement in image quality was realized by an ND filter manufactured by this method. However, in order to cope with high sensitivity, miniaturization, high image quality of a CCD in recent years, image quality may be deteriorated due to an influence resulting from diffusion of light by silver halide particles, particularly in use under special conditions (e.g., a state of a small aperture size under backlight).

In addition, Japanese Patent Application Laid-Open No. 11-38206 (no corresponding U.S. patent) discloses a method of manufacturing an elliptical gradation ND filter using a vacuum evaporation method. However, with this method, there is a drawback in that a density cannot be changed in a very small area (e.g., change in transmittance from 3% to 80% in a range of 3 mm).

Moreover, as a measure for coping with the above-mentioned high image quality, ND filters with single density are adhered to a plurality of aperture blades and driven to generate parts where the ND filters overlap with each other and parts where the ND filters do not overlap with each other. Thus, it becomes possible to change a density. However, with this method, there are drawbacks in that, for example, cost is increased due to increase in the number of ND filters to be used, thickness of a device is increased due to existence of a plurality of ND filters in aperture blades to make it impossible to cope with tendency of miniaturization and space-saving.

Furthermore, in recent years, a stepwise multi-density ND filter has started to be used. However, it has been found that, when an optical path length changes in areas with different densities, a transmission phase changes by a degree equivalent to the change to cause deterioration of image quality (decrease in resolution). The deterioration of image quality is the largest when a transmission phase difference is $\lambda/2$, and is relatively small when the transmission phase difference is $\lambda/4$ to $\lambda/8$ ($\lambda$: 540 nm). In order to eliminate such a phenomenon, provision of a layer for correcting an optical path length is necessary.

SUMMARY OF THE INVENTION

Thus, it is an object of the present invention to provide a method of manufacturing a gradation ND filter which does not cause deterioration of image quality due to diffusion of light, makes it possible to cope with high image quality, has flat spectral characteristics for each density, has a low reflectance, and can correct a transmission phase difference caused by a difference in an optical path length due to continuous change in a film thickness. In addition, it is another object of the present invention to provide a gradation ND filter manufactured by the manufacturing method, an aperture device having the gradation ND filter, and a camera having the aperture device.

The present invention provides a method of manufacturing an ND filter having a gradation density distribution, the ND filter, and an aperture device and a camera having the ND filter. The manufacturing method is as described below.

That is, the present invention provides a method of manufacturing an ND filter having at least two kinds of films on a substrate, the method including the steps of:

forming a film of at least one layer other than an outermost layer having a gradation density distribution while rotating a slit mask integrally with the substrate; and forming a film of the outermost layer without using the slit mask.

Various other forms of the present invention will be apparent in embodiments to be described later.

BRIEF DESCRIPTION OF THE DRAWINGS

FIGS. 4A, 4B and 4C are diagrams showing a slit mask and a mask shape which are used in an embodiment mode and an embodiment of the present invention;

FIGS. 5A, 5B, 5C-1, and 5C-2 are graphs and views showing examples of a film thickness distribution simulation with the slit mask in accordance with an embodiment mode of the present invention;

FIGS. 22A, 22B and 22C are diagrams showing a slit mask and a mask shape used in the embodiment of the present invention;

FIGS. 23A, 23B, 23C-1, and 23C-2 are graphs and views showing examples of a film thickness distribution simulation with a slit mask in accordance with the embodiment of the present invention;

DETAILED DESCRIPTION OF THE PREFERRED EMBODIMENTS

The present invention will be hereinafter described using specific embodiments. However, the present invention is never limited to the embodiments described below. In particular, in the explanation of FIGS. 3A and 3B below, a film forming method for a gradation ND filter is described in which the vacuum evaporation method is used as an example. However, in the present invention, the same effect can also be obtained if various film forming methods such as the sputtering method, the ink jet printing method, and the spray method are used.

<Embodiment 1>

Figure 3A:
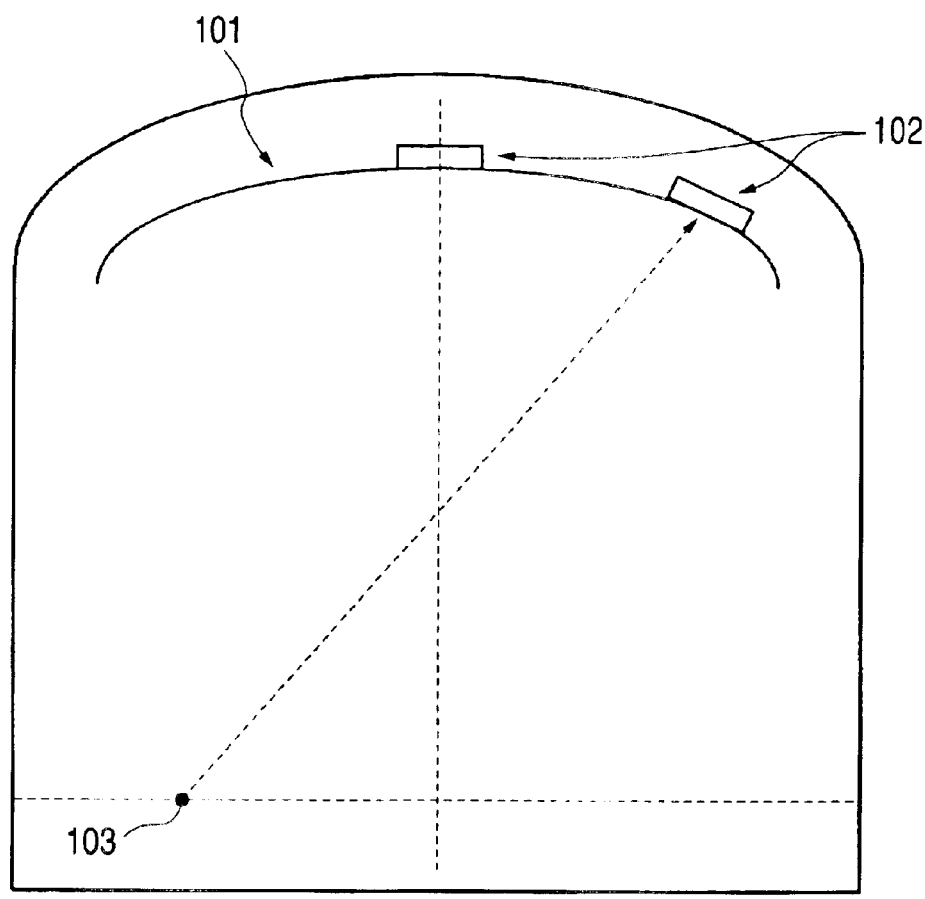
FIG. 3A is a diagram for illustrating a method of manufacturing a gradation ND filter according to a vacuum evaporation method which shows the inside of a chamber of a vacuum evaporation machine.
Figure 3B:
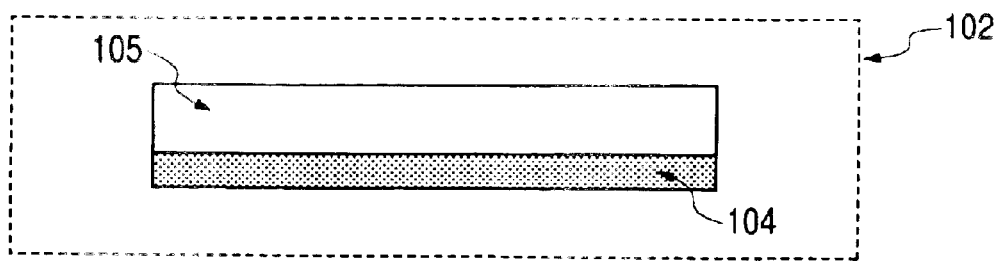
FIG. 3B is an enlarged view of a substrate for illustrating a method of manufacturing a gradation ND filter according to the vacuum evaporation method.

FIG. 3A is a schematic diagram of the inside of a chamber in a vacuum evaporation machine used as an example for explaining each embodiment to be described later. FIG. 3B is an enlarged view of a substrate. In FIGS. 3A and 3B, reference numeral 101 denotes an evaporation umbrella; 102, a substrate to which film formation is applied; 103, an evaporation source; 104, a substrate to be used for film formation; and 105, a substrate jig for fixing the substrate 104.

In addition, it is assumed that the substrate 102 described in this embodiment is put in a state in which the substrate 104 is set in the substrate jig 105 as shown in FIG. 3B.

FIGS. 4A to 4C are diagrams showing a slit mask having a slit type mask shape and used as an example in order to explain this embodiment. In FIG. 4A, reference numeral 106 denotes a slit mask; 107, a width between slits in the slit mask; and 108, a distance between the substrate and the slit mask. FIGS. 4A, 4B, and 4C show a normal shape mask, a sawtooth shape mask, and a comb shape mask, respectively.

In the vacuum evaporation method used in this embodiment, as shown in FIGS. 3A and 3B, the substrate in the chamber is provided in the evaporation umbrella 101, and the substrate 102 rotates together with the evaporation umbrella 101, so that film formation is performed. By providing, for example, the slit mask as shown in FIG. 4A on a film forming side of the substrate 102, evaporation particles to be evaporated from the evaporation source 103 can reach the substrate 102 passing through a slit or cannot reach the substrate 102 while being blocked by the slit mask depending upon a positional relation between the evaporation source 103 and the substrate 102. As a result, a film thickness distribution as shown in FIG. 5A is obtained.

Figure 1:
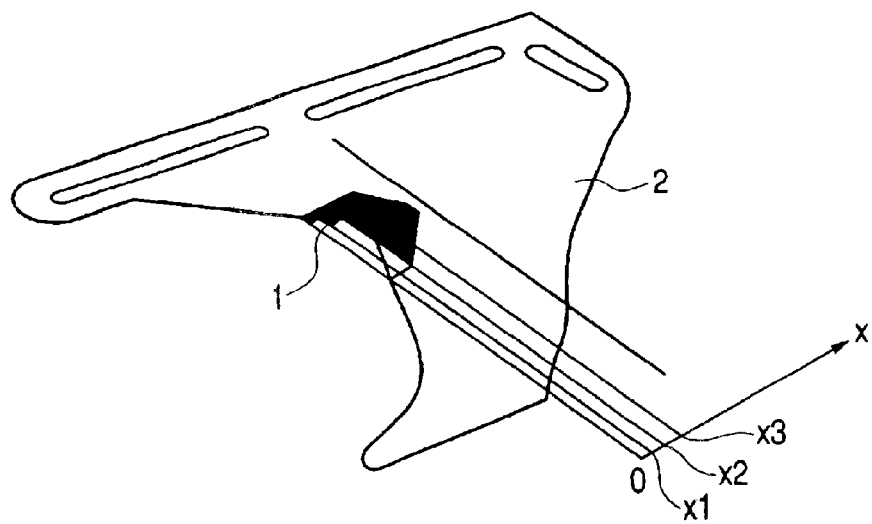
FIG. 1 is a view showing a state in which a gradation ND filter obtained in the present invention is attached to an aperture blade.
Figure 5A:
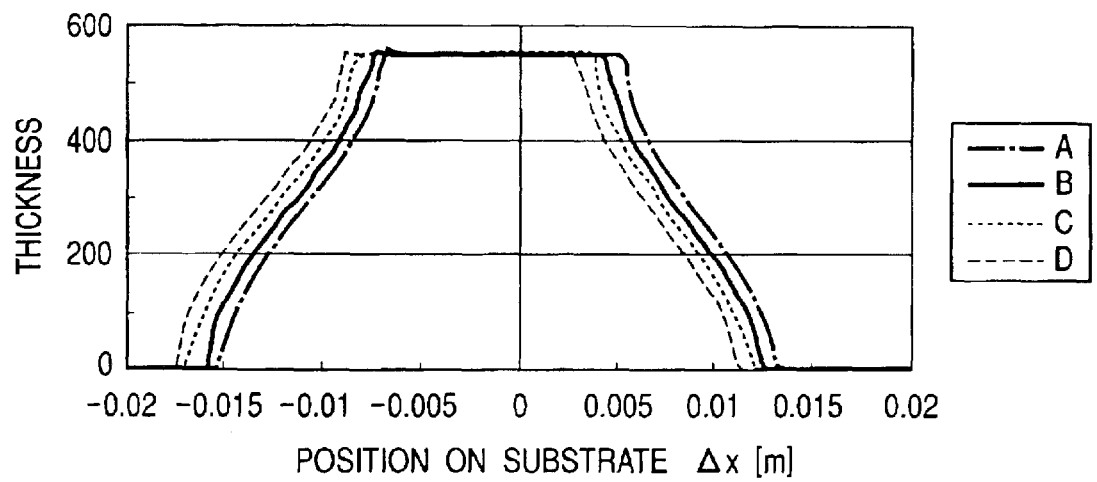
Figure 5B:
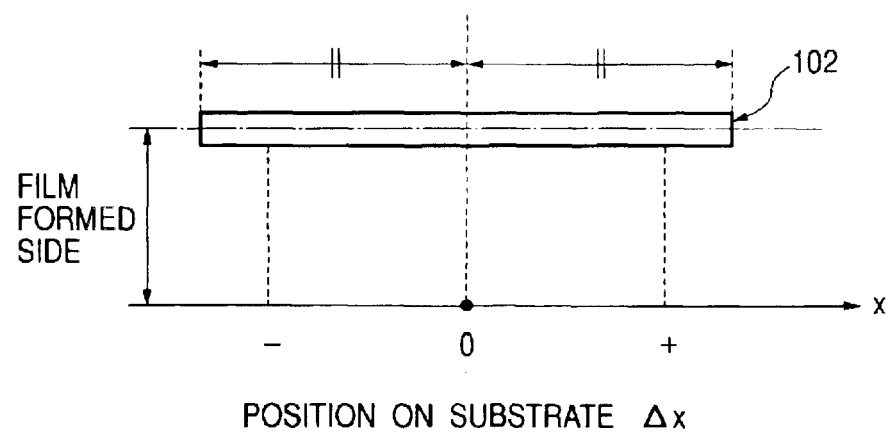
Figures 1, 5C:
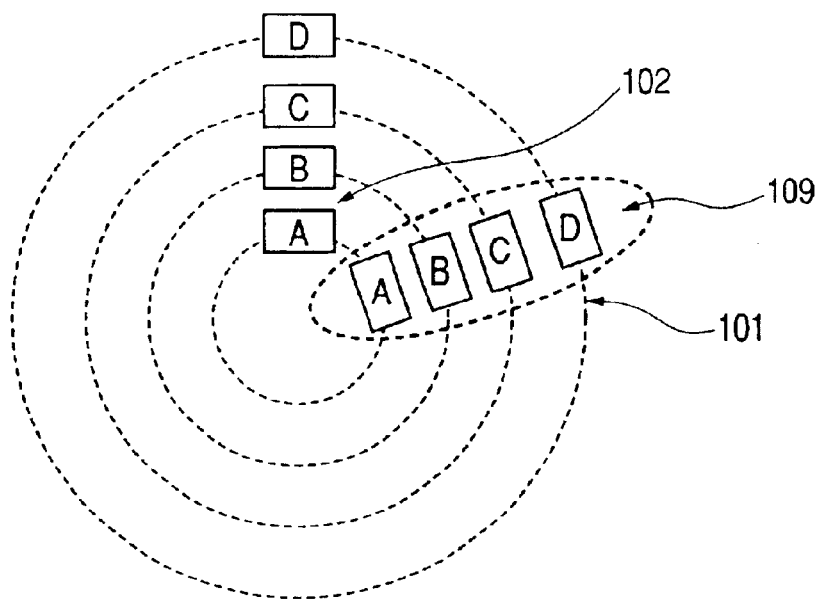
Figures 2, 5C:
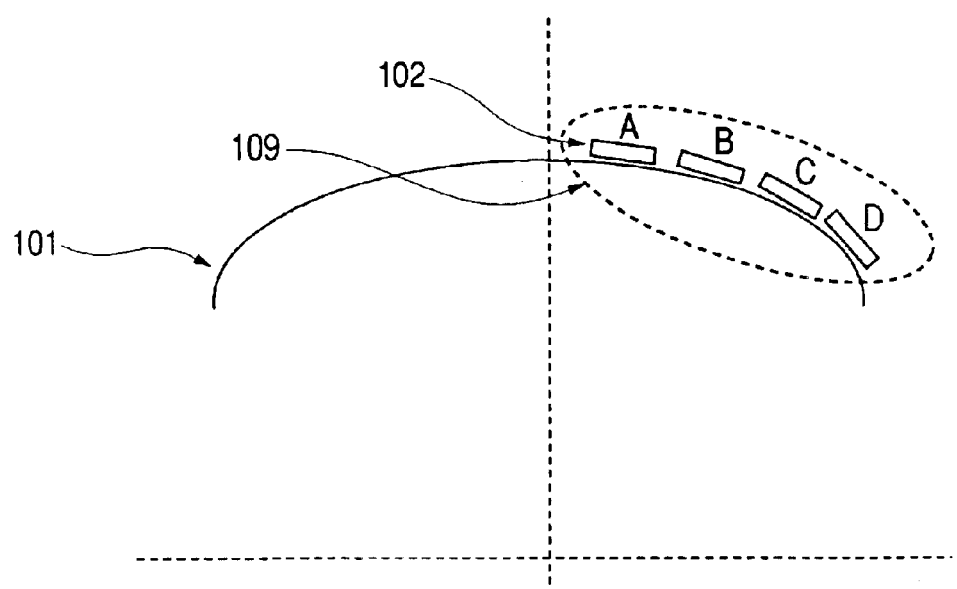

FIG. 5A shows a result of a film thickness distribution simulation actually carried out using the slit mask shown in FIG. 4A. FIG. 5B is an explanatory graph of a position $\Delta x$ on the substrate which is a parameter of FIG. 5A. FIG. 5C-1 is a birds-eye view of positions in the evaporation umbrella. FIG. 5C-2 is a sectional view of positions in the evaporation umbrella. Reference numeral 109 denotes substrate positions in the evaporation umbrella 101.

The film thickness distribution shown in FIG. 5A naturally varies depending upon the substrate positions 109 in the evaporation umbrella, the width 107 between slits of the mask, the distance 108 between the substrate and the mask, or the like. This is also evident taking into account the simulation result that film thickness distributions are different depending upon the substrate positions 109 in the evaporation umbrella as shown in FIG. 5A. Therefore, in other words, by adjusting the width 107 between the slits of the mask or the distance 108 between the substrate and the mask, a thin film formed on the substrate obtains an arbitrary gradation film thickness distribution. Since an increase in film thickness means an increase in a density of the film and a decrease in a transmittance thereof, obtaining an arbitrary film thickness distribution can alternatively be expressed as obtaining an arbitrary gradation density distribution, which is an object of the present invention.

In addition, as to a shape of such a slit mask for producing an arbitrary gradation density distribution, a slit mask of the shape as shown in FIG. 4A is used in this embodiment and is explained together with the simulation result in FIG. 5A. However, actually, as shown in FIGS. 4A and 4C, various shapes of a mask such as a sawtooth shape and a comb shape can be used depending upon a gradation density distribution of an ND filter which is desired to be manufactured.

Embodiment 1 will be hereinafter described in more detail using Embodiment 1-a.

<Embodiment 1-a>

In this embodiment, first, the first layer to a layer immediately below the outermost layer in the film structure shown in FIG. 6 were formed as described below by the vacuum evaporation method on a plastic substrate (hereinafter referred to as PET substrate) with a thickness of 75 $\mu$m.

In this embodiment, the normal shape slit mask of FIG. 4A was used as the slit mask and was set as shown in the figure.

In addition, as a film generation method, the vacuum evaporation method was selected because a film thickness could be controlled relatively easily and diffusion in a wavelength range in a visible range was extremely small.

Further, as a material of the substrate, PET was selected which was high in heat resistance (glass transition point Tg), high in transparency in a wavelength range in a visible range, and low in water absorption.

Next, the slit mask was removed, and the outermost layer was formed with a constant film thickness under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

After the film formation from the first layer to the outermost layer as described above, heat treatment was performed at a temperature of 110° C. in an atmosphere for one hour. The temperature of 110° C. was selected because an effect of environmental stability is insufficient under a temperature of 100° C., and a problem is likely to occur, for example, thermal deterioration of the substrate is caused and a crack is generated in the film if a temperature exceeds 130° C.

Therefore, as a temperature for heat treatment, a temperature between 110° C. and 130° C. is appropriate.

In order to examine environmental stability, a shelf test under the conditions of 60° C., 85%, and 240 hours was performed for the multi-layer film thus formed, and transmittances were measured before and after the test. Then, the difference was only 0.2% or less, and almost no difference was observed. As a reference, when the same environmental test was performed for the one which is not subjected to heat treatment and a transmittance before and after the test was measured, about 2% increase was observed.

As a factor of such a phenomenon, it is conceivable that a substrate temperature at the time of vacuum evaporation is low. It is considered that a transmittance increases due to influences in that sealing density of a film is largely affected by a substrate temperature at the time of film formation and, if the temperature is low, the sealing density falls, moisture, oxygen, and the like are easily transmitted and, thus, oxidation of $Ti_xO_y$ itself which is an absorption film is facilitated and in that a protection effect of a dielectric film such as $Al_2O_3$ film for protecting $Ti_xO_y$ is small. Improvement of the environmental stability by the heat treatment is considered to be an "aging effect".

Usually, in the case in which a glass substrate is used, a film is formed after heating the glass substrate to a substrate temperature of 200° C. to 250° C., desirably around 300° C.

However, in the case in which the substrate is made of plastics as in this case, it is necessary to form a film at a temperature at which the substrate does not cause heat shrinkage, and a substrate temperature therefor is restricted to less than 150° C.

As to a film thickness distribution, a result substantially equivalent to the result of the simulation was obtained as shown in FIG. 5A. However, this is a distribution from a first layer to an eighth layer. An outermost layer has a fixed film thickness.

Figure 2A:
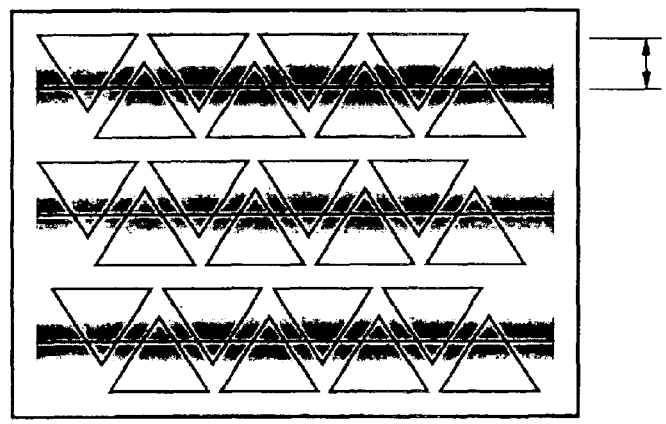
FIG. 2A is a diagram illustrating a punching state at the time of manufacturing a gradation ND filter in accordance with an embodiment of the present invention and shows a cutout pattern of substantially a triangle shape.
Figure 2B:
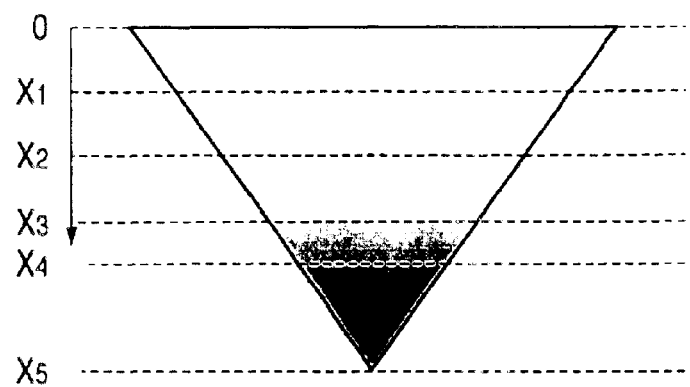
FIG. 2B is a diagram illustrating a punching state at the time of manufacturing a gradation ND filter in accordance with an embodiment of the present invention and shows a structure of the cut-out gradation ND filter of substantially a triangle shape.
Figure 37:
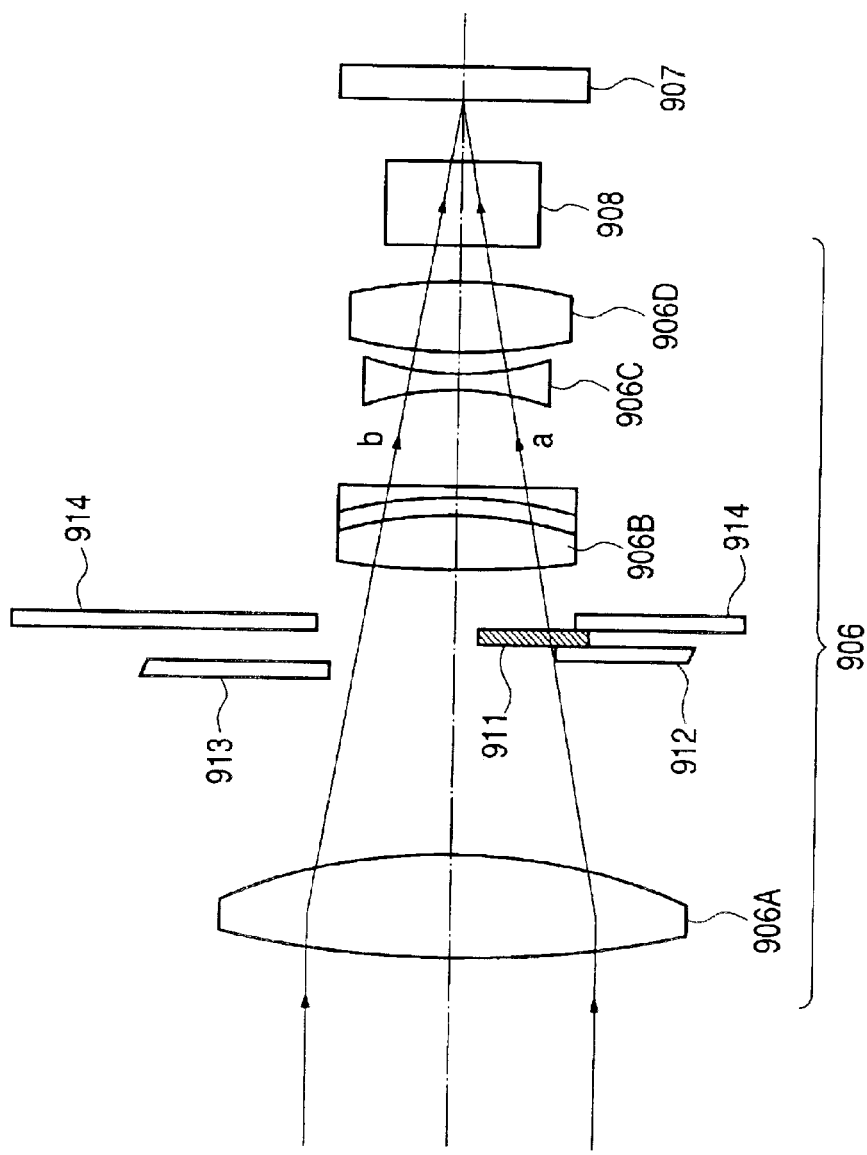
FIG. 37 is a view showing a photographing optical system used in a video camera for illustrating a prior art.

A pattern as shown in FIG. 2A is formed for the plastic substrate, on which the multi-layer film is formed in this way. Then the plastic substrate is cut out in a substantially triangular shape to complete a gradation ND filter. In the case in which this gradation ND filter is applied to an aperture device, a gradation ND filter 1 is stuck to an aperture blade 2 of an aperture device as shown in FIG. 1 to realize a state of FIG. 1. The aperture device is the same as the one described with reference to FIG. 37 and is provided with a plurality of aperture blades which are relatively driven to change a size of an aperture. The gradation ND filter is formed as shown in FIG. 2B. 0 indicates an end surface portion, and X1, X2, and X3 from there are density change areas. A highest uniform density is observed in the areas X3 to X4. The areas X4 to X5 are adhesive areas for adhering the filter to the blades.

Figure 7:
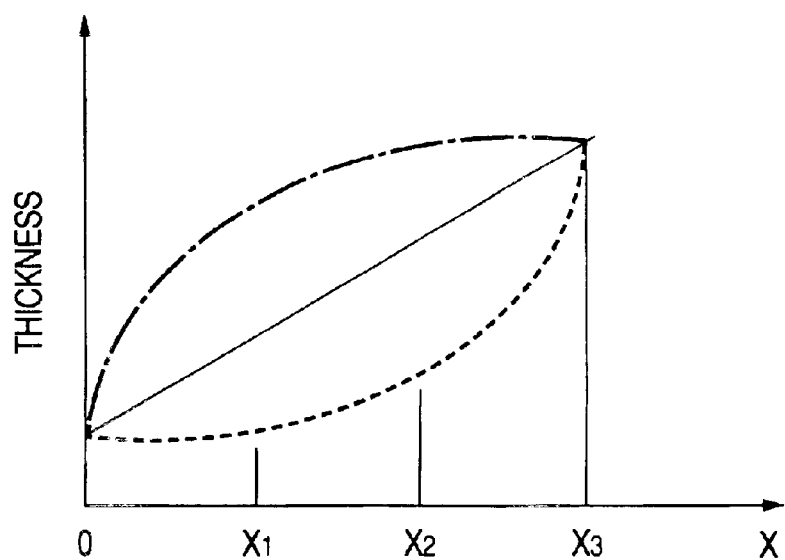
FIG. 7 is a graph representing a relation between a distance and a film thickness (from a first layer to a layer immediately below an outermost layer) in accordance with the embodiment of the present invention.
Figure 8:
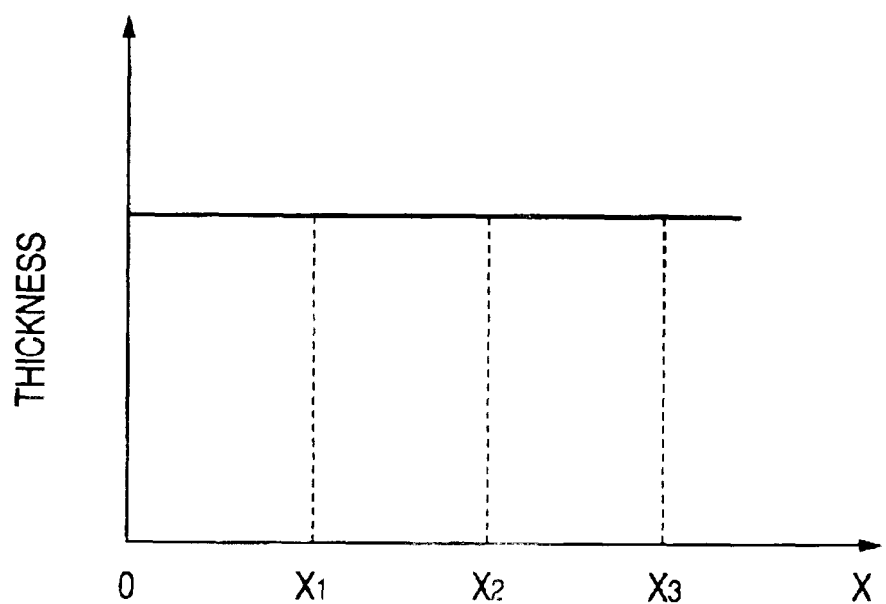
FIG. 8 is a graph representing a relation between a distance and a film thickness (a ninth layer) in accordance with the embodiment of the present invention.
Figure 9:
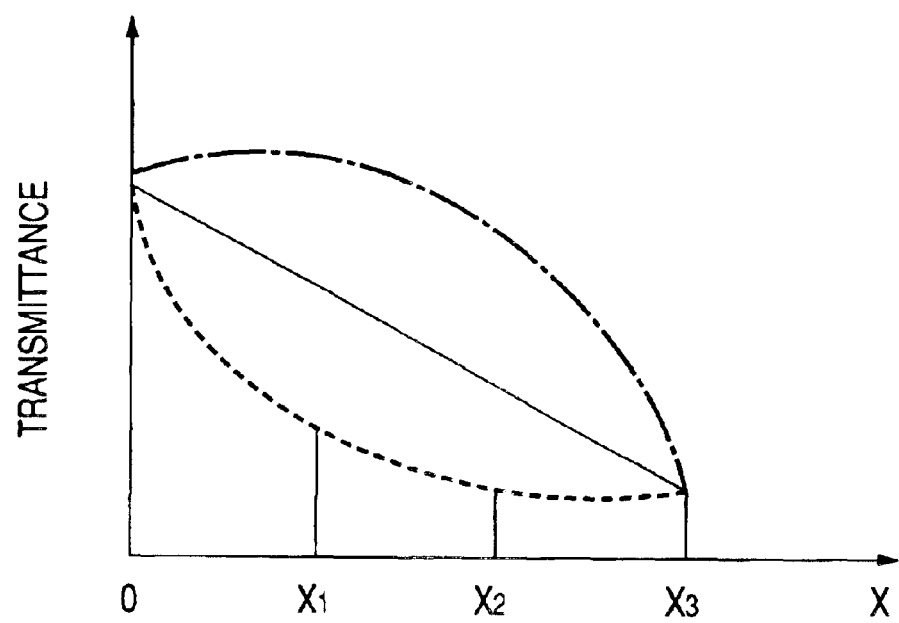
FIG. 9 is a graph representing a relation between a distance and a transmittance in accordance with the embodiment of the present invention.
Figure 10:
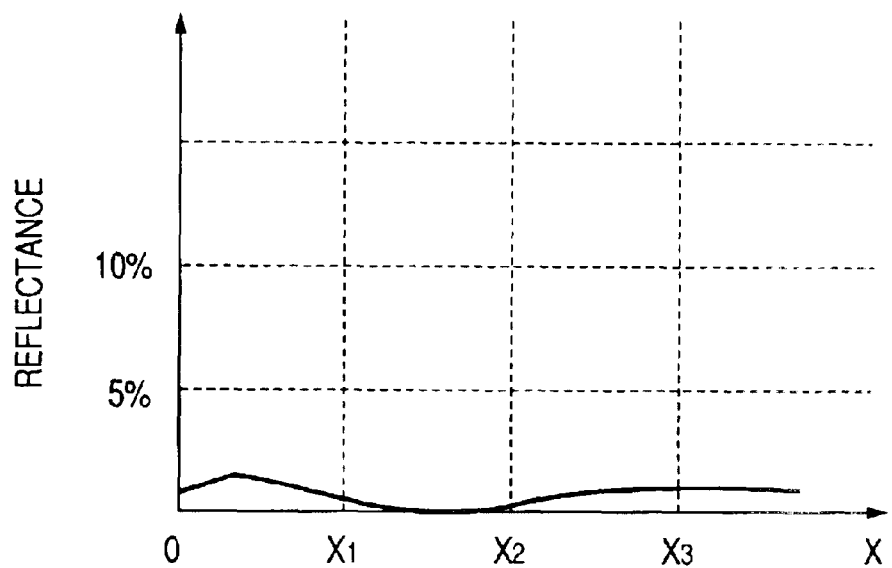
FIG. 10 is a graph representing a relation between a distance and a reflectance in accordance with the embodiment of the present invention.

In this embodiment, a relation between a distance (X) and a film thickness is as shown in FIG. 7 for the first layer to the eighth layer and as shown in FIG. 8 for the ninth layer. In addition, a relation between the distance (X) and a transmittance and a relation between the distance (X) and a reflectance are as shown in FIGS. 9 and 10, respectively.

Figure 11:
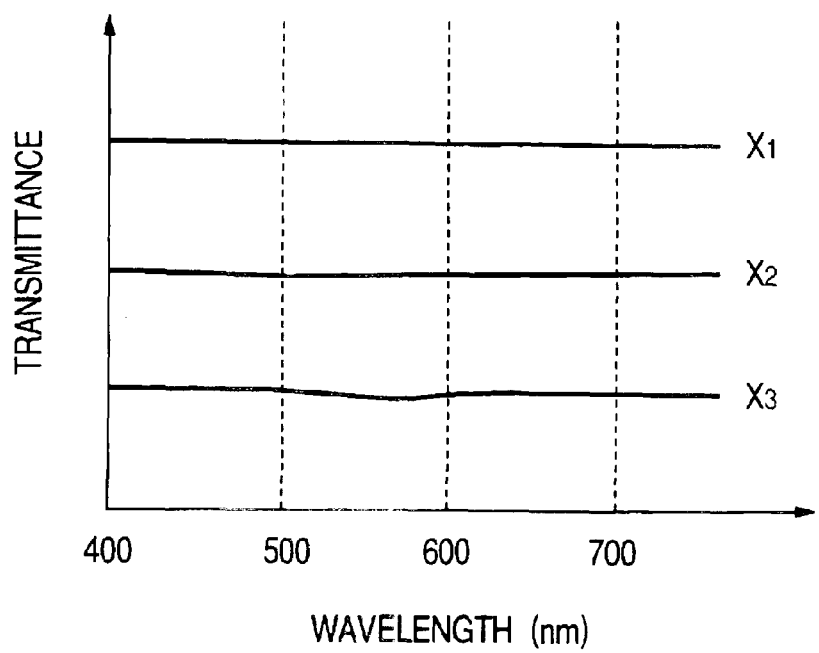
FIG. 11 is a graph representing a spectral transmittance in accordance with the embodiment of the present invention.
Figure 12:
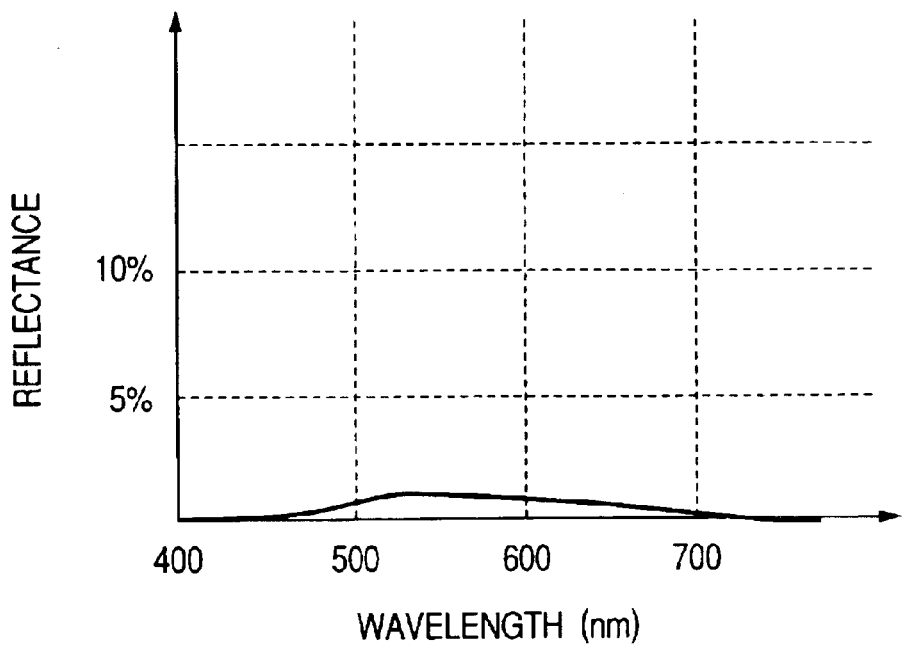
FIG. 12 is a graph representing a spectral reflectance in accordance with the embodiment of the present invention.

Moreover, a spectral transmittance is as shown in FIG. 11, and a spectral reflectance is as shown in FIG. 12. Incidentally, the result is based on the case in which a slit width is 0.02 m and a lifting distance of the mask from the substrate is 0.01 m.

In the relation between the distance (X) and the film thickness, the film thickness sequentially increases as shown in FIG. 7. As a way of this change, in general, an inclination tends to be gentle as the slit width is increased, and a uniform density area tends to increase as the lifting distance is increased. It is possible to control a desired inclination state and a uniform density area according to those two parameters.

Moreover, by changing the slit shape from linear shape to the sawtooth shape or the comb shape as shown in FIGS. 4B and 4C, it becomes possible to perform precise control. For example, if it is desired to secure a long hem, the sawtooth shape is more advantageous.

According to the embodiment descried above, a gradation ND filter in which a spectral characteristic is flat at each density can be manufactured, and it becomes possible to cope with various needs for change in gradation.

In addition, by performing heat treatment after the evaporation, environmental stability can be improved.

Further, an increase in a reflectance due to change in conditions for preventing reflection, which occurs when a film thickness partly changes, can be suppressed. By using this effect, an aperture device with improved equality of light amount which can meet a requirement for coping with high image quality can be realized.

Next, Comparative Example 1 of Embodiment 1-a will be described.

COMPARATIVE EXAMPLE 1

This comparative example is different from Embodiment 1-a only in that a structure of an outermost layer is changed. In Embodiment 1-a, the layers other than the outermost layer were formed using the slit mask, and the outermost layer was formed with a constant thickness without using the slit mask. On the other hand, in this comparative example, all layers were formed using the slit mask.

In this comparative example, the film structure shown in FIG. 6 was formed by the vacuum evaporation method on the PET substrate with a thickness of 75 μm as described below by changing each film thickness of all the layers from the first layer to the outermost layer, which is the ninth layer.

The outermost layer film was formed with ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

The normal shape mask of FIG. 4A was used as the mask, and the slit mask was set as shown in the figure.

In addition, as a film forming method, the vacuum evaporation method was selected because the film thickness could be controlled relatively easily and diffusion in a wavelength range in a visible range was extremely small.

Further, as the substrate, PET was selected, which is high in heat resistance (glass transition point Tg), high in transparency in a wavelength range in a visible range, and low in water absorption.

As described above, after the film formation from the first layer to the outermost layer, the film was subjected to heat treatment in an atmosphere at a temperature of 110° C. for one hour. The reason for selecting the temperature of 110° C. is the same as that in Embodiment 1.

In addition, in order to investigate environmental stability, a shelf test under the conditions of 60° C., 85%, and 240 hours was performed for the plastic ND filter, as in the above-mentioned embodiment. Then, a result same as that in the above-mentioned embodiment was obtained. Further, as to a film thickness distribution, a result substantially equal to the result of the simulation was obtained as shown in FIG. 5A.

Figure 13:
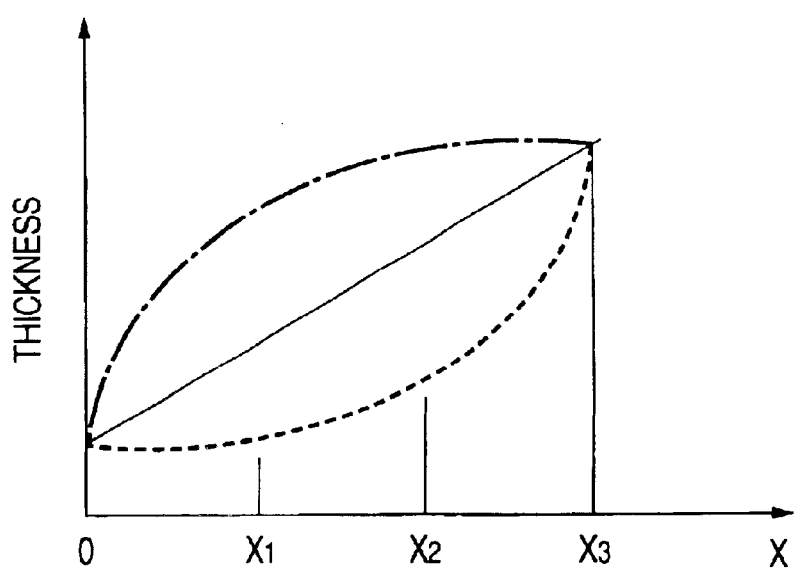
FIG. 13 is a graph representing a relation between a distance and a film thickness (from a first layer to an outermost layer) in a comparative example.
Figure 14:
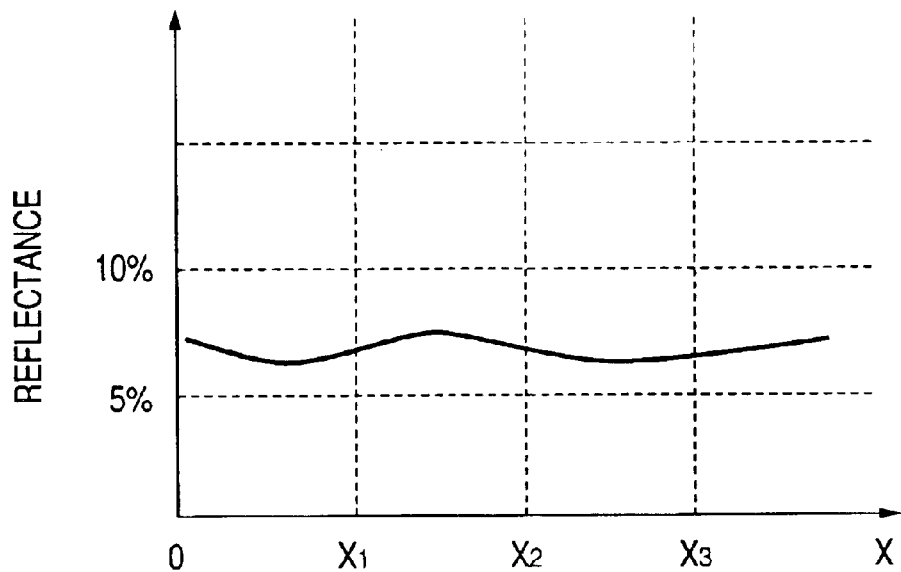
FIG. 14 is a graph representing a relation between a distance and a reflectance in a comparative example.

In this comparative example, a relation between a distance (X) and a film thickness is shown in FIG. 13 for the first layer to ninth layers. In addition, a relation between a distance (X) and a transmittance and a relation between the distance (X) and a reflectance are shown in FIGS. 9 and 14, respectively.

Figure 15:
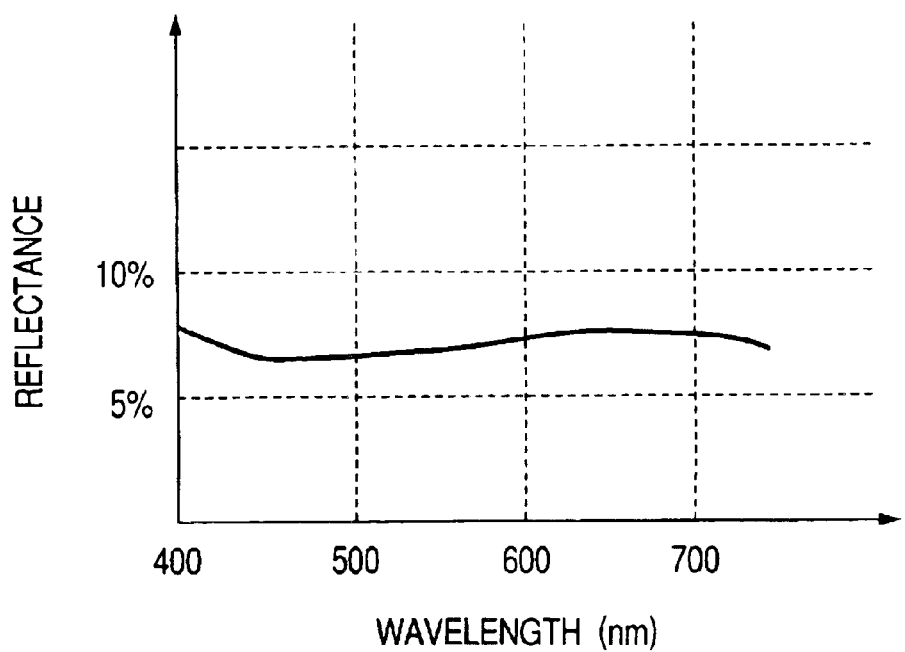
FIG. 15 is a graph representing a spectral reflectance in the comparative example.

In addition, a spectral transmittance and a spectral reflectance are shown in FIGS. 11 and 15, respectively. Incidentally, this result is based on the case in which a slit width is 0.02 m, and a lifting distance of the mask from the substrate is 0.01 m.

As in this comparative example, when film thicknesses of all the layers are changed, conditions for preventing reflection are not met, so that an increase in reflectance is caused, and a "ghost phenomenon" or "flare phenomenon" occurs in terms of image quality.

Next, an embodiment 1-b will be described.

<Embodiment 1-b>

This embodiment is an embodiment in which Embodiment 1 is further modified.

Figure 16D:
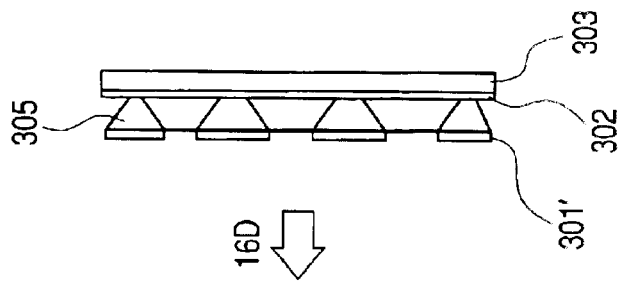
FIG. 16D is a view of a slit mask, which is set on the substrate at the time of film formation from a second layer to a layer immediately below an outermost layer, of the embodiment viewed from a direction of arrow 16D in FIG. 16C, which shows how films from the second layer to a layer immediately below the outermost layer stick by providing a space between the slit mask and the substrate.
Figure 16C:
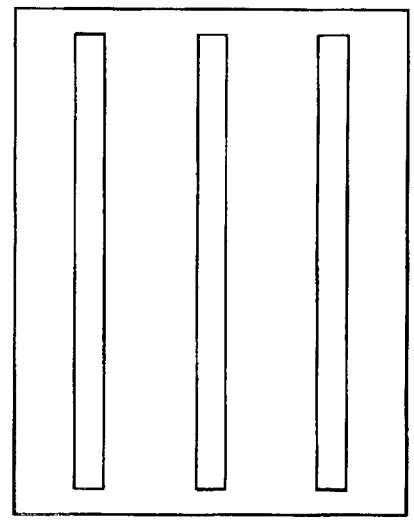
FIG. 16C is a view of a slit mask, which is set on the substrate at the time of film formation from a second layer to a layer immediately below an outermost layer, of the embodiment viewed from a position above the slit mask.
Figure 16B:
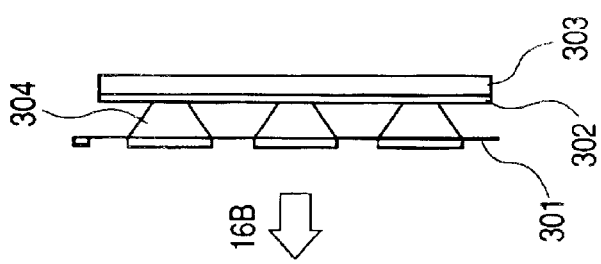
FIG. 16B is a view of a slit mask, which is set on a substrate at the time of film formation of a first layer, of the embodiment of the present invention viewed from a direction of arrow 16B in FIG. 16A, which shows how a film of the first layer deposits by providing a space between the slit mask and the substrate.
Figure 16A:
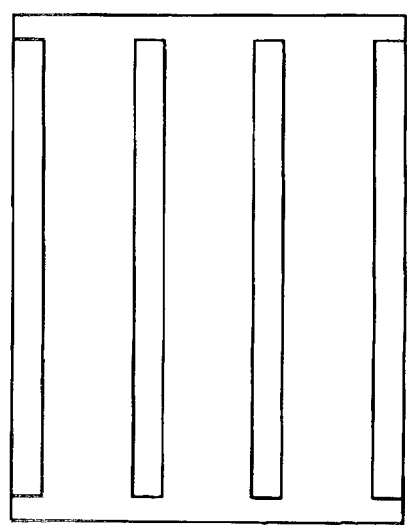
FIG. 16A is a view of a slit mask, which is set on a substrate at the time of film formation of a first layer, of the embodiment of the present invention viewed from a position above the slit mask.

This embodiment of the present invention will be hereinafter described. FIG. 16A is a top view of a state in which slit masks are set on a substrate. FIG. 16B is a view of the same viewed from a direction of an arrow 16B. In this embodiment, first, a first layer in the film structure shown in FIG. 6 was formed on a plastic substrate (hereinafter referred to as PET substrate) with a thickness of 75 μm by the vacuum evaporation method as described below.

In this embodiment, the normal shape slit mask of FIG. 4A was used as the slit mask, and a plurality thereof were arranged as shown in FIGS. 16A and 16B. In this figure, reference numeral 302 denotes a PET substrate, and 303 denotes a film forming jig. As shown in the figure, the mask 301 is set apart from the substrate 302, whereby a film of a first layer has a film thickness distribution as indicated by reference numeral 304 of FIG. 16B. A film thickness at this point is set so as to cancel a phase difference caused by a density distribution.

In addition, as a film forming method, the vacuum evaporation method was selected because a film thickness could be controlled relatively easily and diffusion in a wavelength range in a visible range was extremely small.

Further, as the substrate, PET was selected, which is high in heat resistance (glass transition point Tg), high in transparency in a wavelength range in a visible range, and low in water absorption.

Next, this slit mask 301 was removed, and film formation for the second layer to the layer immediately below the outermost layer was performed using another slit mask 301'. FIG. 16C is a top view of a state in which the slit mask 301 is set on a substrate. FIG. 16D is a view of the same viewed from a direction of arrow 16D. Consequently, distribution of the film thickness from the second layer to the layer immediately below the outermost layer is as indicated by reference numeral 305 of FIG. 16D.

Finally, the slit mask 301' was removed, and the outermost layer was formed under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

After the film formation from the first layer to the outermost layer as described above, heat treatment was performed at a temperature of 110° C. in an atmosphere for one hour. The temperature of 110° C. was selected because an effect of an environmental stability improvement is insufficient if a temperature is lower than 100° C., and if a temperature exceeds 130° C., a problem occurs, for example, in that thermal deterioration of the substrate is caused and a crack is generated in the film. Therefore, as a temperature for heat treatment, a temperature between 110° C. and 130° C. is appropriate.

In order to examine an environmental stability, a shelf test under the conditions of 60° C., 85%, and 240 hours was performed for the plastic ND filter, and a transmittance was measured before and after the test, respectively. Then, the difference was 0.2% or less, that is, almost no difference was observed. As a reference, when the same shelf test was performed for an ND filter which was not subjected to heat treatment and a transmittance before and after the test was measured, about 2% increase was observed.

As a factor of such a phenomenon, it is possible that a substrate temperature at the time of vacuum evaporation is low. It is considered that a transmittance increases due to influences in that: sealing density of a film is largely affected by a substrate temperature at the time of film formation and, if the temperature is low, the sealing density falls, moisture, oxygen, and the like are easily transmitted and, thus, oxidation of $Ti_xO_y$ itself which is an absorption film is promoted; and a protection effect of a dielectric film such as $Al_2O_3$ film for protecting $Ti_xO_y$ is small. Improvement of the environmental stability by the heat treatment is considered to be an "aging effect".

Usually, in the case in which a glass substrate is used, a film is formed after heating the glass substrate to a substrate temperature of 200° C. to 250° C., desirably around 300° C.

However, in the case in which a substrate is made of plastic as in this case, it is necessary to form a film at a temperature at which the substrate does not suffer heat shrinkage, and a substrate temperature therefor is restricted to less than 150° C.

A pattern as shown in FIG. 2A is formed on the plastic substrate in which a multi-layer film manufactured in this way is formed. Then, the plastic substrate is cut out in a substantially triangular shape to complete a gradation ND filter. In the case in which this gradation ND filter is applied to an aperture device, a gradation ND filter 1 is stuck to an aperture blade 2 of an aperture device as shown in FIG. 1. The aperture device is the same as the one described with reference to FIG. 37, and is provided with a plurality of aperture blades that are relatively driven to change the size of an aperture. The gradation ND filter is formed as shown in FIG. 2B. 0 indicates an end surface portion, and the areas 0, X1, X2, and X3 are density change areas. A highest uniform density is formed in the areas X3 to X4. The areas X4 to X5 are adhesive areas for bonding the filter to the blades.

Figure 17:
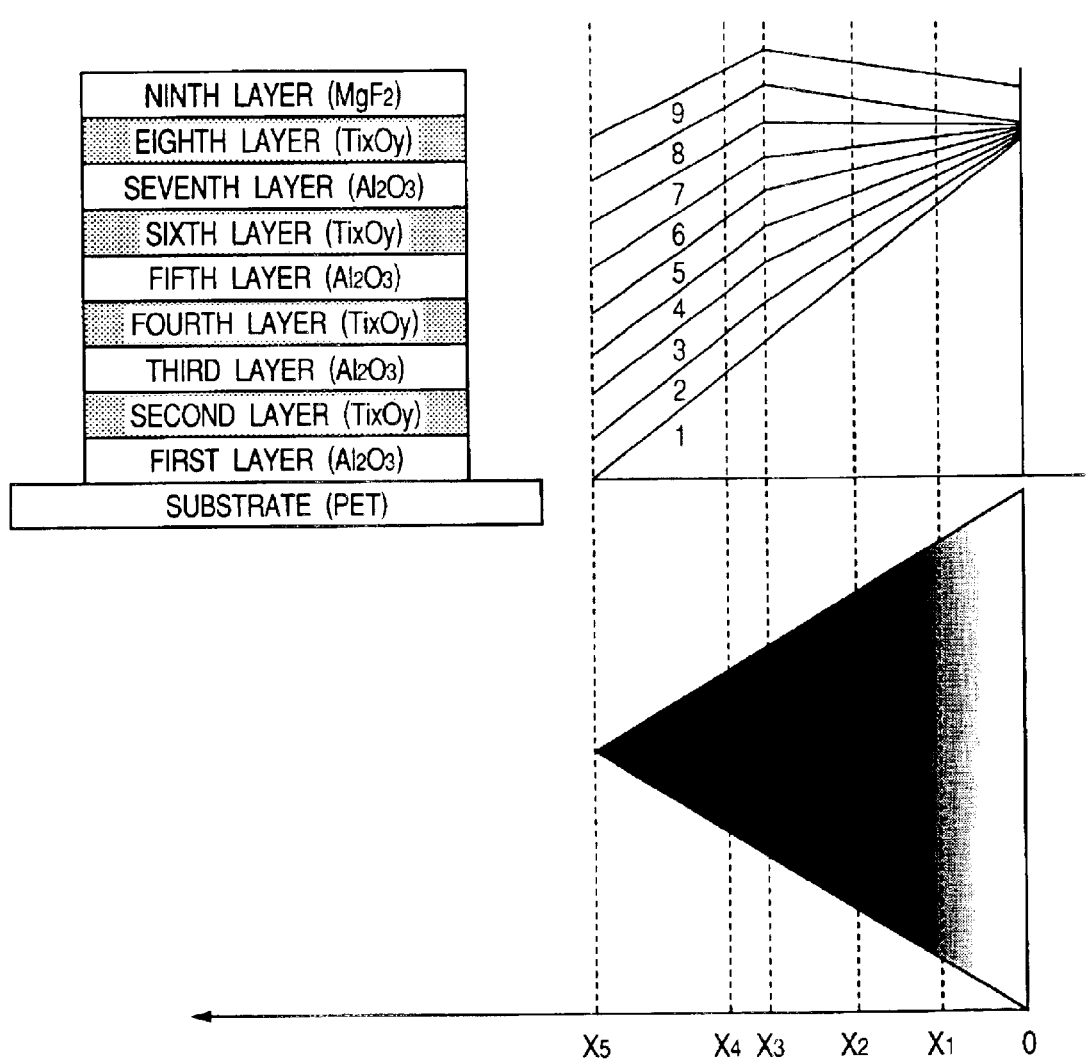
FIG. 17 is a diagram showing a gradation ND filter and a state concerning each film thickness corresponding to the gradation ND filter in accordance with the embodiment of the present invention.

A relation between a distance and a film thickness at this point is as shown in FIG. 17.

First, the film from the second layer to the layer immediately below the outermost layer will be described.

In areas 0, X1, X2, and X3, film thicknesses of the respective areas continuously increase. A way of this change can be set to a desired pattern according to a slit width of the slit mask and a space between the substrate and the slit.

In the areas X3, X4, and X5, since the density is constant, each film thickness is also constant. Next, as to the outermost layer, this is a film also serving for prevention of reflection and environmental stability, and has a constant thickness in the areas 0 to X5 as ¼ λ (λ=500 nm to 600 nm) in an optical film thickness n×d.

In addition, a film thickness of the first layer decreases continuously in the areas 0, X1, X2 and X3 contrary to the film thickness of the second layer to the layer immediately below the outermost layer. As a way of this change, in general, an inclination tends to be gentle as the slit width is increased, and a uniform density area tends to increase as the lifting distance is increased.

The film thickness of the first layer is set to a film thickness that corrects change in the film thickness from the second layer to the layer immediately below the outermost layer. It is possible to conduct control to achieve a desired inclination state and a uniform density area according to these two parameters.

By adopting such a film structure, it becomes possible to correct a difference of optical path length with respect to continuous change in the density of the areas 0, X1, X2, and X3 and to control change in a transmission phase of each area. As a result, high image quality can be maintained.

In addition, it also becomes possible to make a reflectance constant in each area, and "ghost" and "flare" phenomena can be suppressed.

As a correction layer for correcting a difference of an optical path length, the first layer is most suitable. The reason for this is that changing the film thickness of the first layer least affects a spectral characteristic of transmittance and reflectance.

Figure 18:
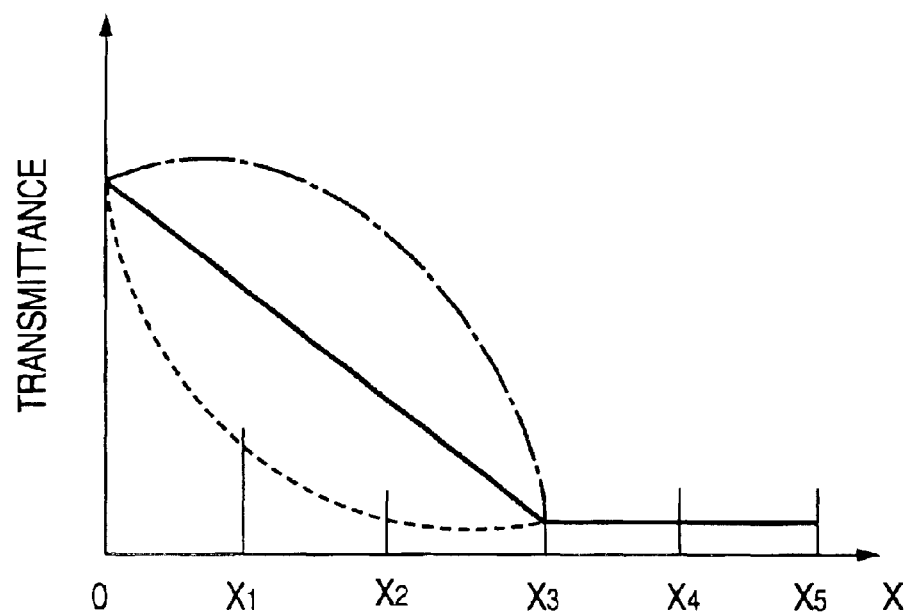
FIG. 18 is a graph representing a relation between a distance and a transmittance in accordance with the embodiment of the present invention.
Figure 19:
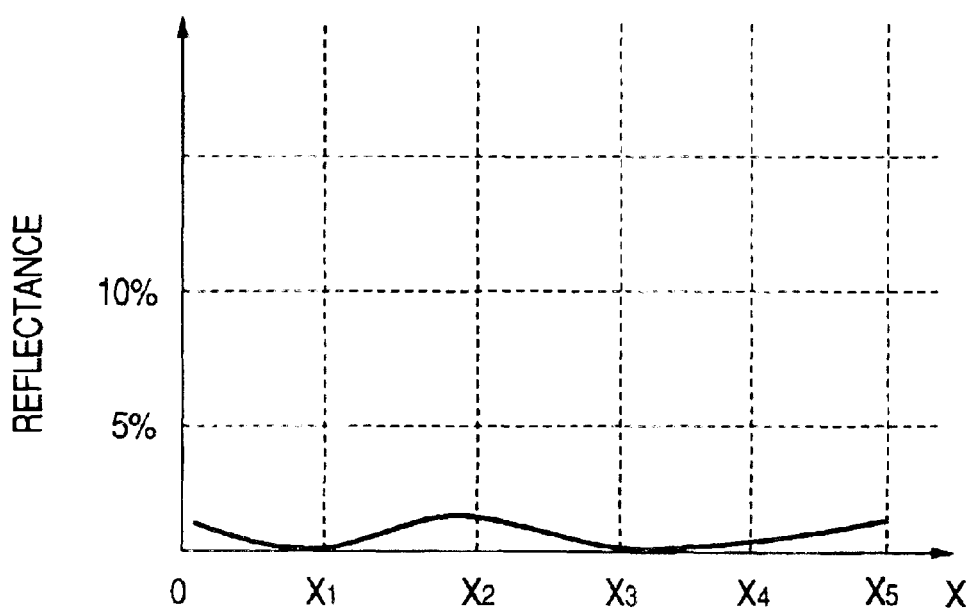
FIG. 19 is a graph representing a relation between a distance and a reflectance in accordance with the embodiment of the present invention.
Figure 20:
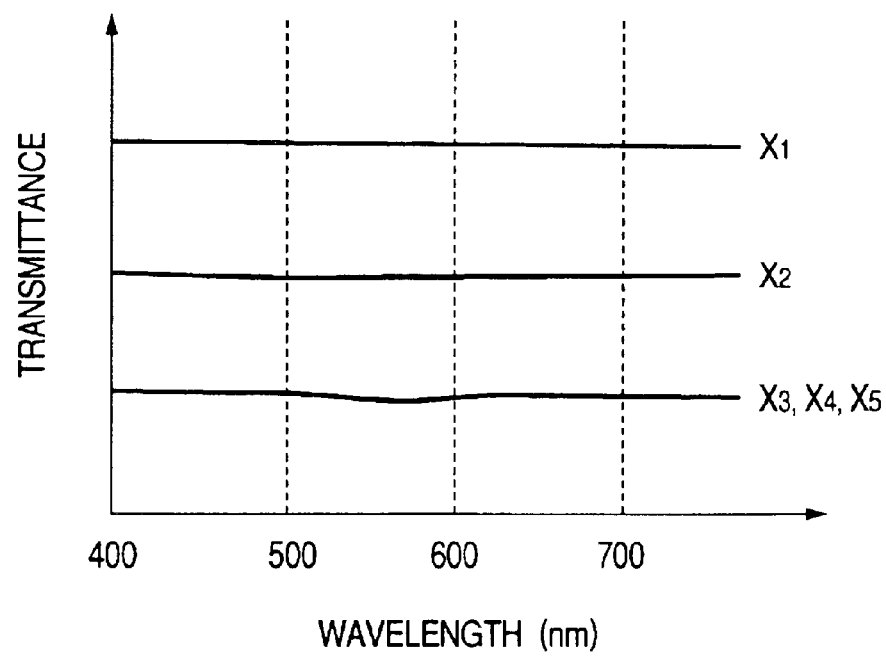
FIG. 20 is a graph representing a spectral transmittance in accordance with the embodiment of the present invention.
Figure 21:
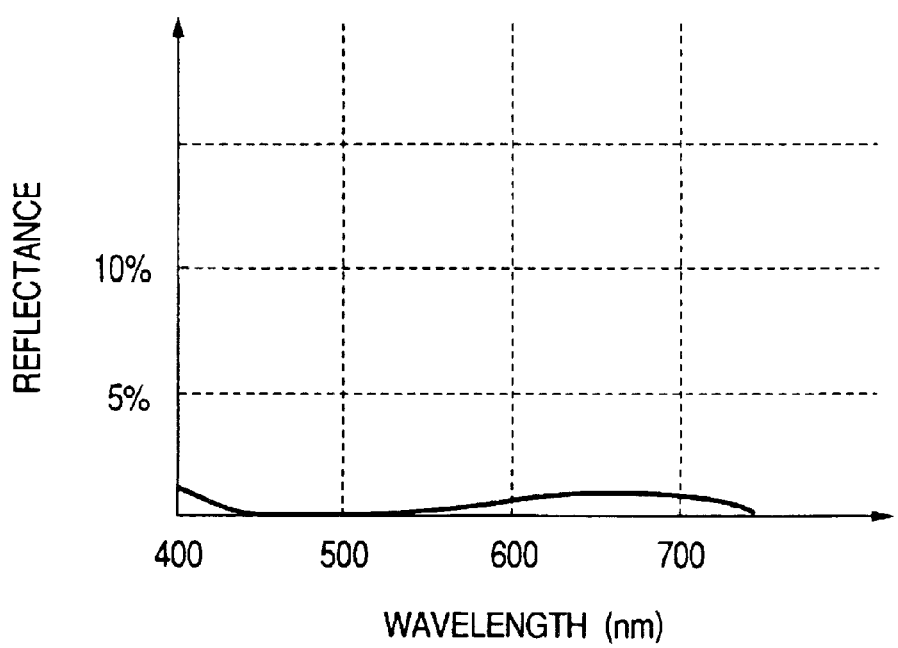
FIG. 21 is a graph representing a spectral reflectance in accordance with the embodiment of the present invention.

In addition, a relation between a distance and a transmittance and a relation between the distance and a reflectance at this point were as shown in FIGS. 18 and 19. Moreover, a spectral transmittance was as shown in FIG. 20, and a spectral reflectance was as shown in FIG. 21.

Incidentally, this is a result in the case in which a slit width is 0.02 m and a lifting distance of the mask from the substrate is 0.01 m. In the relation between the distance and the film thickness, as a way of this change, in general, an inclination tends to be gentle as the slit width is increased, and a uniform density area tends to increase as the lifting distance is increased. It is possible to control a desired inclination state and a uniform density area according to the two parameters. Moreover, by changing the slit shape from linear shape to the sawtooth shape or the comb shape as shown in FIGS. 4B and 4C, it becomes possible to perform finer control. For example, if it is intended to secure a long hem, the sawtooth shape is more advantageous.

According to the embodiment described above, it becomes possible to manufacture a gradation ND filter in which a spectral characteristic is flat in each density, and various needs for change in gradation can be met. Moreover, by performing heat treatment after the evaporation, environmental stability can be improved. In addition, an increase in a reflectance due to a change in conditions for preventing reflection, which occurs when a film thickness partly changes, can be suppressed, and it becomes possible to correct a transmission phase difference generated from a difference of an optical path length due to a continuous change in a film thickness, whereby aperture device which can meet a requirement for coping with a high image quality can be realized.

Next, an embodiment 1-c will be described. The embodiment 1-c is a further improvement of Embodiment 1.

<Embodiment 1-c>

Figure 23A:
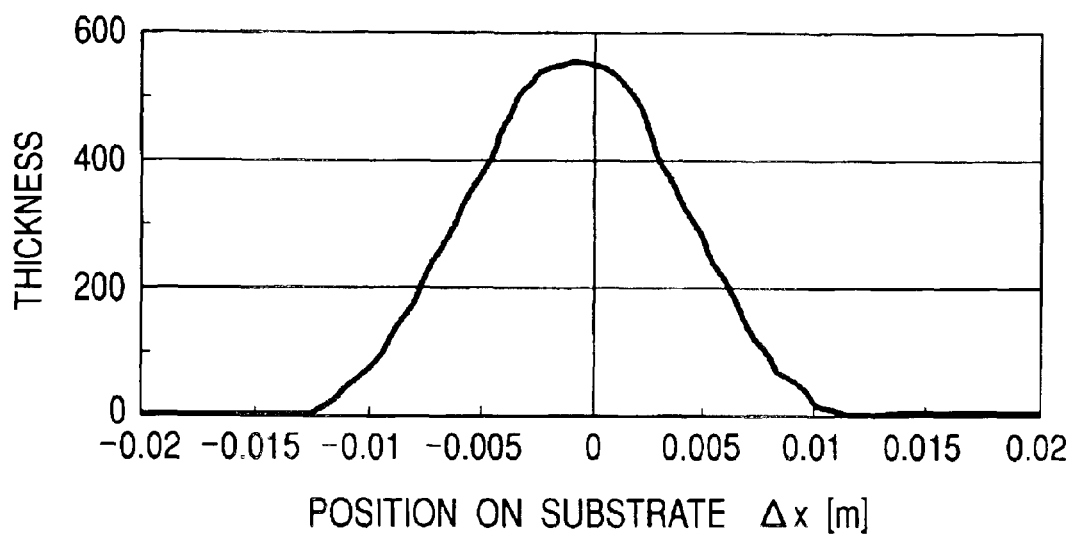

In the vacuum evaporation method used in this embodiment, as shown in FIGS. 3A and 3B, a substrate 102 in a chamber is provided in an evaporation umbrella 101, and the substrate 102 rotates together with this evaporation umbrella 101, whereby a film is formed. By providing, for example, a slit mask 106 of a sawtooth shape as shown in FIG. 22A on a film forming side of this substrate 102, evaporation particles to be evaporated can reach the substrate 102 after passing through a slit, or cannot reach the substrate 102 because they are blocked by the slit mask, depending upon a positional relation between an evaporation source 103 and the substrate 102. As a result, a film thickness distribution as shown in FIG. 23A is obtained.

Here, a reason why the sawtooth shape as shown in FIGS. 22A to 22C is used in the slit mask will be described.

Figure 24A:
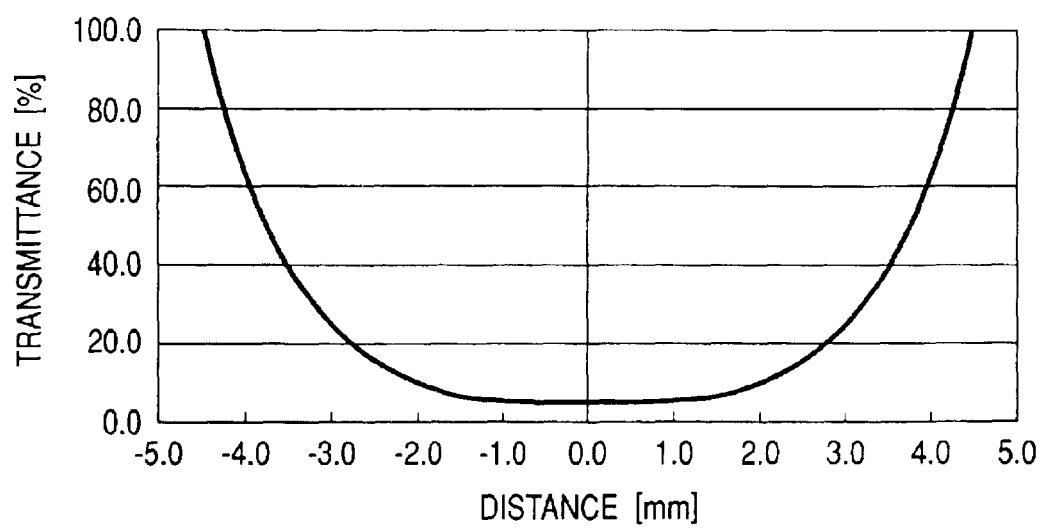
FIG. 24A is a graph showing a gradation transmittance which is ideal in accordance with the embodiment of the present invention.
Figure 24B:
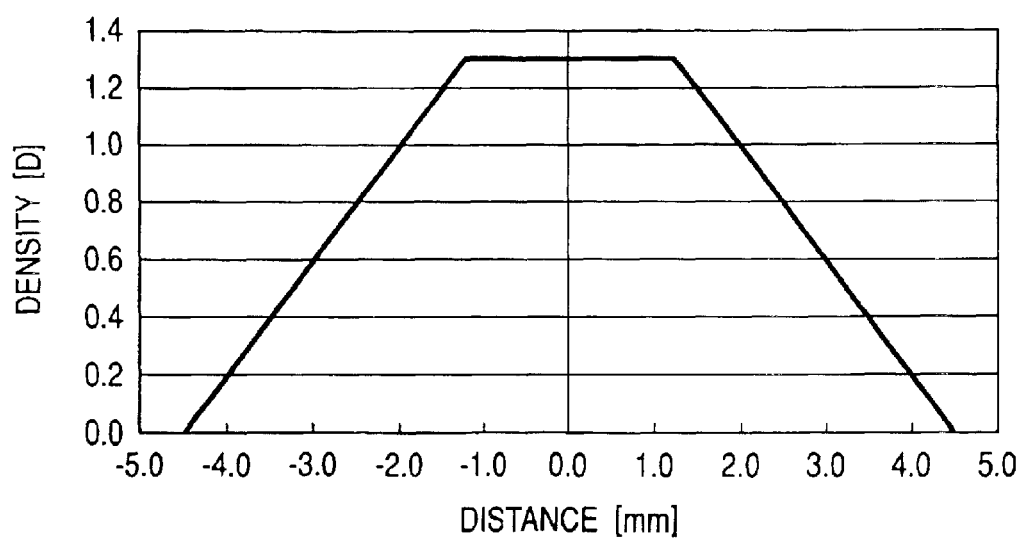
FIG. 24B is a graph showing a gradation density distribution which is ideal in accordance with the embodiment of the present invention.

Although it is conceivable that a mask shape to be used for a slit mask varies depending upon a density distribution to be produced, a density distribution aimed at in this embodiment is a gradation density distribution in which a transmittance sequentially decreases or increases. Such a density distribution is considered to be the most general specification when an application of an ND filter is taken into account. More specifically, for example, it is a distribution having a transmission characteristic as shown in FIG. 24A. In order to manufacture an ND filter satisfying this specification, it is necessary to obtain a density distribution as shown in FIG. 24B. In other words, since a density and a film thickness are in a liner relation, it is necessary to obtain a film thickness distribution as shown in FIG. 24B.

Figure 25A:
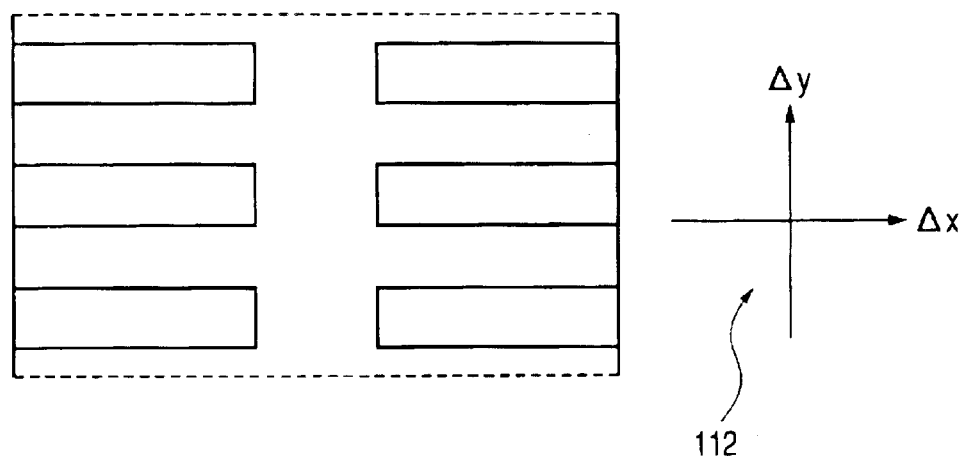
FIG. 25A is a diagram showing a slit mask of a comb shape in accordance with the embodiment of the present invention.
Figure 25B:
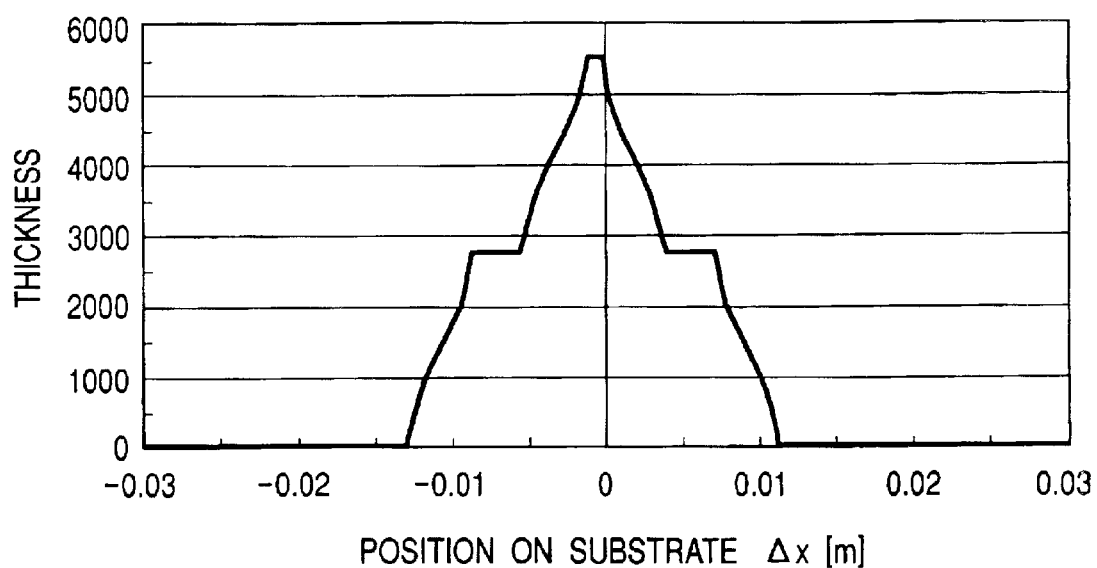
FIGS. 25B and 25C are graphs showing examples of a film thickness distribution simulation at the time when a slit mask has a comb shape.
Figure 25C:
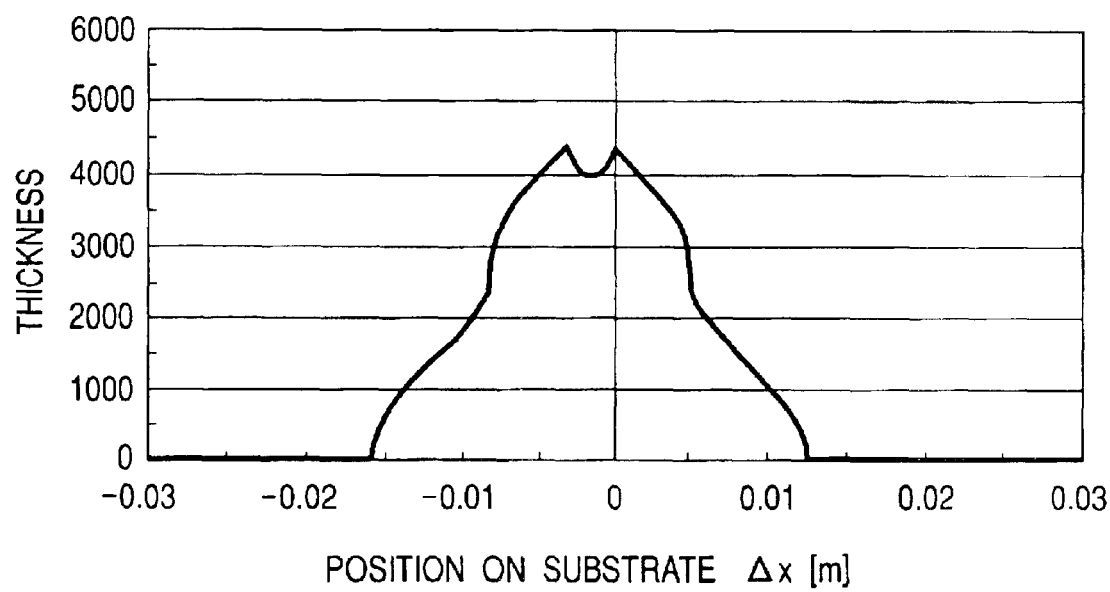
Figure 25D:
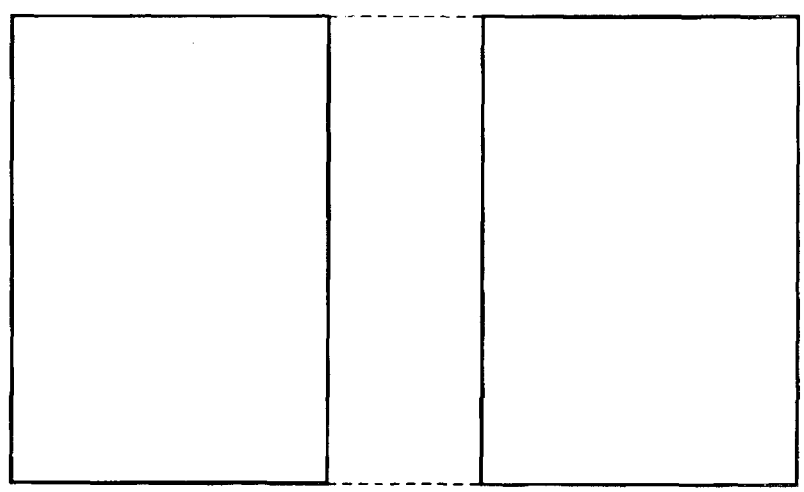
FIG. 25D is a diagram showing a linear slit mask.
Figure 25E:
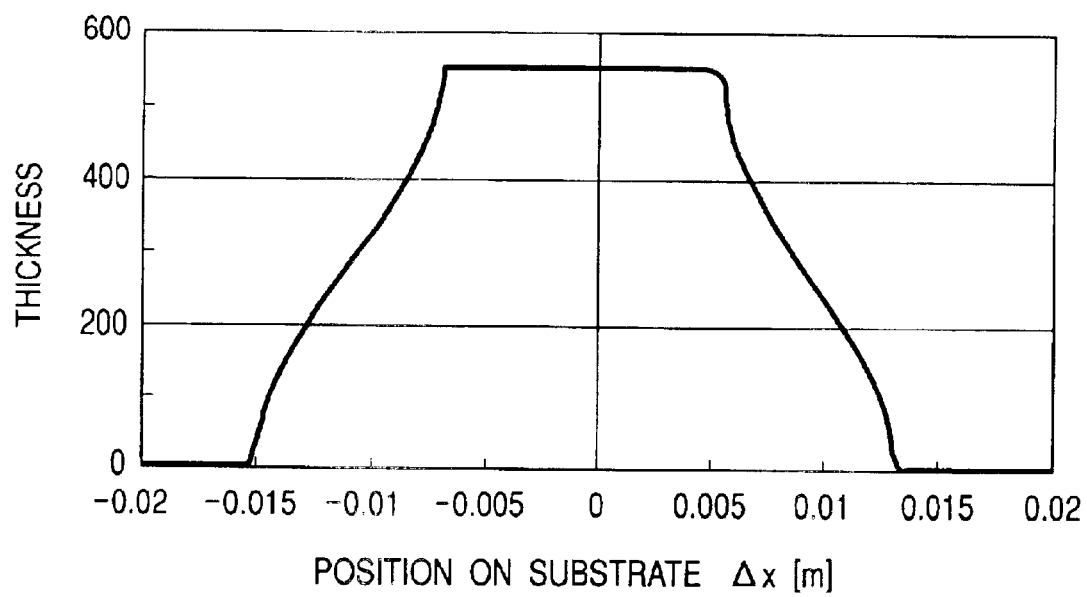
FIG. 25E is a graph showing an example of a film thickness distribution simulation at the time when a slit mask has a linear shape.

FIG. 25A shows a slit mask of a comb shape, FIGS. 25B and 25C are examples of a film thickness distribution simulation in the case where a slit mask have a comb shape, FIG. 25D shows a linear type slit mask; and FIG. 25E shows an example of a film thickness distribution simulation in the case where a slit mask has a linear shape.

As is seen from results of the simulation, in the linear mask as shown in FIG. 25D, a hem part of a film thickness distribution expands and rises as shown in FIG. 25E, and the film thickness distribution as shown in FIG. 24B cannot be obtained. In order to improve this, if a comb shape slit mask as shown in FIG. 25A with a larger influence of invasion as compared with the linear mask is used, inflection points are generated as shown in FIG. 25B. In order to solve this problem, it is necessary to secure a sufficient distance between the substrate and the mask. However, if this distance is increased, a distribution at a maximum value of the film thickness fluctuates as shown in FIG. 25C. Moreover, with the comb shape slit mask, a film thickness distribution in a $\Delta y$ axis direction on the substrate is not constant and extremely fluctuates, and it is generally difficult to keep the film thickness distribution within the specification.

On the other hand, if a sawtooth shape slit mask is used, improvement can be realized in that rising of the hem part of the film thickness distribution is brought close to that of FIG. 24B according to the same idea as the comb shape mask, and invasion to the $\Delta y$ axis direction on the substrate is uniform as compared with the comb shape. Therefore, the problems concerned can be solved. Similarly to the comb shape slit mask, even the sawtooth shape slit mask cannot make the film thickness distribution in the $\Delta y$ axis direction completely constant. However, as described above, since invasion in the $\Delta y$ axis direction is close to uniform as compared with the comb shape mask, it is possible to obtain a result sufficient enough to satisfy the specification by setting the distance between the substrate and the slit mask, the width of the slit, and the like to be most appropriate.

Figure 23B:
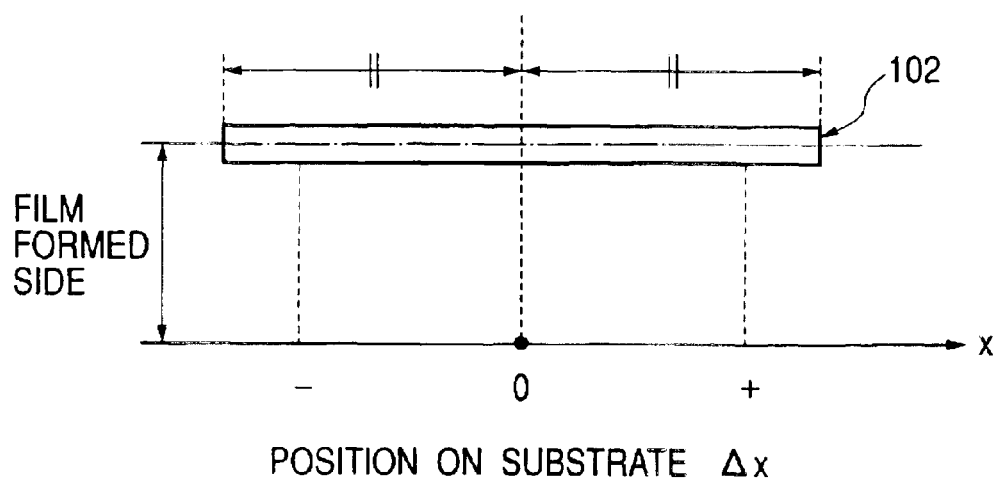
Figures 1, 23C:
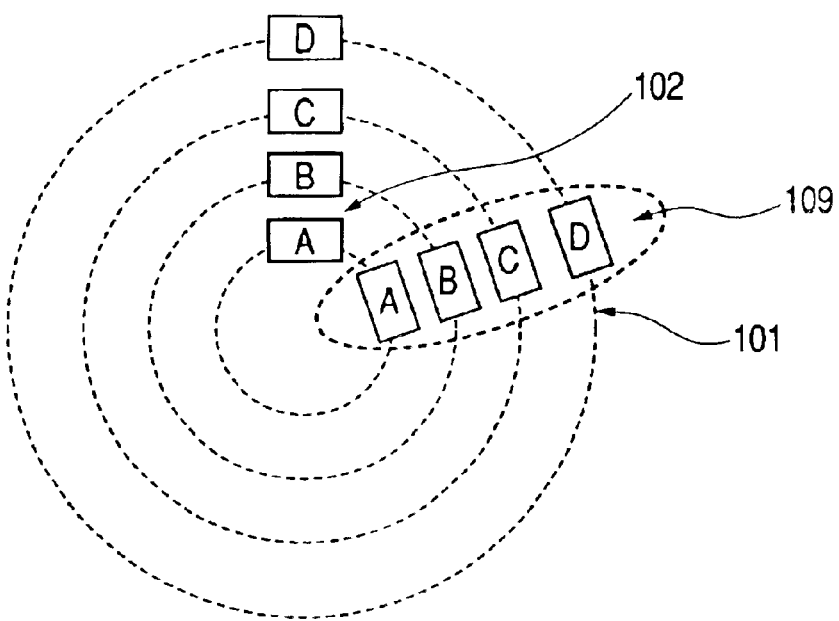
Figures 2, 23C:
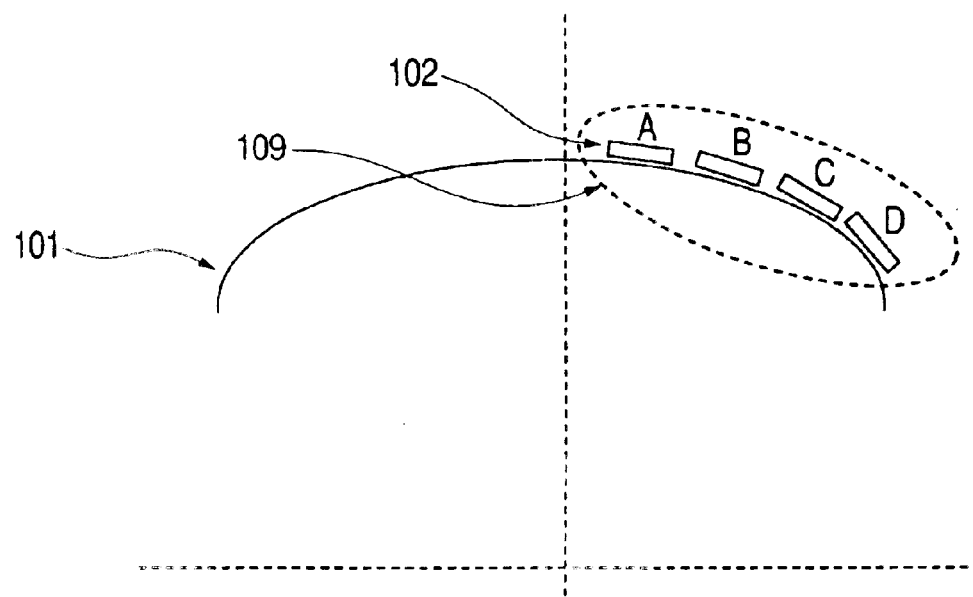

FIG. 23A shows a result of a film thickness distribution simulation actually carried out using a sawtooth/liner slit mask shown in FIG. 22A. FIG. 23B is an explanatory view of a position $\Delta x$ on a substrate which is a parameter of FIG. 23A. FIG. 23C-1 is a birds-eye view of positions in an evaporation umbrella 101. FIG. 23C-2 is a sectional view of the positions in the evaporation umbrella 101. Reference numeral 109 denotes a substrate position in the evaporation umbrella 101.

The film thickness distribution shown in FIG. 23A naturally varies depending upon the substrate position 109 in the evaporation umbrella 101, a width 107 between the slits of the mask, a distance 108 between the substrate and the mask, a mask shape, and the like. Therefore, in other words, by adjusting the width 107 between the slits of the mask, the distance 108 between the substrate and the mask, the mask shape, and the like, a thin film formed on the substrate obtains an arbitrary gradation film thickness distribution.

Since an increase in a film thickness means an increase in a density of the film and decrease in a transmittance thereof, obtaining an arbitrary film thickness distribution can alternatively be expressed as obtaining an arbitrary gradation density distribution, which is an object of the present invention.

In addition, as to a shape of such a slit mask for producing an arbitrary gradation density distribution, the sawtooth/linear slit mask of a shape as shown in FIG. 22A is used in this embodiment and is explained together with the simulation result in FIG. 23A. However, actually, as shown in FIGS. 22B and 22C, a shape of the sawtooth is not limited to a straight line but can be a curved line shape, and it is possible that a ratio of change in the straight line and the curved line varies. Moreover, the examples of a mask shape shown in FIGS. 22A to 22C is a shape symmetrical with respect to one projected portion. However, it is not always necessary to have such a shape, and it is possible that the shape is asymmetrical. It is conceivable that the shape varies depending upon a gradation density distribution of an ND filter desired to be manufactured.

By using the sawtooth slit mask described in this embodiment, it becomes possible to manufacture a gradation ND filter in which a spectral characteristic is flat in each density, and various needs for change in gradation can be met. Moreover, by performing heat treatment after the evaporation, environmental stability can be improved.

In addition, increase in a reflectance due to change in conditions for preventing reflection, which occurs when a film thickness partly changes, can be suppressed and, by using this slit mask, an aperture device with improved uniformity of light quantity which can meet a requirement for coping with high image quality can be realized.

Next, this embodiment will be described more specifically.

In this embodiment, first, a film was formed from the first layer to a layer immediately below the outermost layer in the film structure shown in FIG. 6 by the vacuum evaporation method on a PET substrate (hereinafter referred to as PET substrate) with a thickness of 75 $\mu$m by alternately stacking $Al_2O_3$ and $Ti_xO_y$ as shown in the Figure. In this embodiment, the sawtooth/linear slit mask of FIG. 22A was used and was arranged as shown in the Figure. In addition, as a film forming method, the vacuum evaporation method was selected because a film thickness can be controlled relatively easily and diffusion in a wavelength range in a visible range was extremely small.

Further, as the substrate, PET was selected, which is high in heat resistance (glass transition point Tg), high in transparency in a wavelength range in a visible range, and low in water absorption.

Next, the slit mask was removed, and the outermost layer was formed with a constant film thickness under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

After the film formation from the first layer to the outermost layer as described above, heat treatment was performed at a temperature of 110° C. in the atmosphere for one hour. The temperature of 110° C. was selected because an effect of environmental stability is insufficient if a temperature is lower than 100° C., and if a temperature exceeds 130° C., a problem occurs, for example, in that thermal deterioration of the substrate is caused and a crack is generated in the film. Therefore, as a temperature for heat treatment, a temperature between 110° C. and 130° C. is appropriate.

In order to investigate environmental stability, a shelf test under the conditions of 60° C., 85%, and 240 hours was performed for the plastic ND filter, and a transmittance was measured before and after the test, respectively. Then, the difference was only 0.2% or less, that is, almost no difference was observed. As a reference, when the same shelf test was performed for an ND filter which was not subjected to heat treatment and a transmittance before and after the test was measured, about 2% increase was observed.

As a factor of such a phenomenon, it is possible that a substrate temperature at the time of vacuum evaporation is low. It is considered that a transmittance increases due to influences in that: sealing density of a film is largely affected by a substrate temperature at the time of film formation and, if the temperature is low, the sealing density falls, moisture, oxygen, and the like are easily transmitted and, thus, oxidation of $Ti_xO_y$ itself which is an absorption film is promoted; and a protection effect of a dielectric film such as $Al_2O_3$ film for protecting $Ti_xO_y$ is small. Improvement of the environmental stability by the heat treatment is considered to be an "aging effect".

Usually, in the case in which a glass substrate is used, a film is formed after heating the glass substrate to a substrate temperature of 200° C. to 250° C., desirably around 300° C.

However, in the case in which a substrate is made of plastic as in this case, it is necessary to form a film at a temperature at which the substrate does not suffer heat shrinkage, and a substrate temperature therefor is restricted to less than 150° C.

As to a film thickness distribution, a result substantially equivalent to a result of a simulation was obtained as shown in FIG. 23A. However, this is a distribution from a first layer to an eighth layer. An outermost layer has a constant film thickness.

A pattern as shown in FIG. 2A is formed on the plastic substrate in which a multi-layer film manufactured in this way is formed. Then the plastic substrate is cut out in a substantially triangular shape to complete a gradation ND filter. In the case in which this gradation ND filter is applied to an aperture device, a gradation ND filter 1 is stuck to an aperture blade 2 of an aperture device as shown in FIG. 1. The aperture device is the same as the one described with reference to FIG. 37 and is provided with a plurality of aperture blades which are relatively driven to change the size of an aperture. The gradation ND filter is formed as shown in FIG. 2B. 0 indicates an end surface portion, and the areas 0, X1, X2, and X3 are density change areas. A highest uniform density is formed from the areas X3 to X4. The areas from X4 to X5 are adhesive areas for adhering the filter to the blades.

Figure 26:
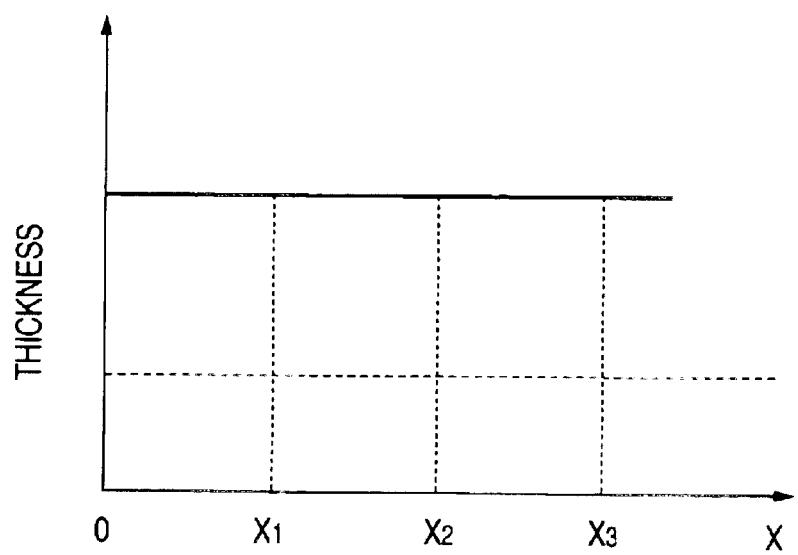
FIG. 26 is a graph representing a relation between a distance and a film thickness (a ninth layer) in accordance with the embodiment of the present invention.

In this embodiment, a relation between a distance (X) and a film thickness is as shown in FIG. 7 for the first to eighth layers and as shown in FIG. 26 for the ninth layer. In addition, a relation between the distance (X) and a transmittance and a relation between the distance (X) and a reflectance are as shown in FIGS. 9 and 10, respectively.

Moreover, a spectral transmittance is as shown in FIG. 11, and a spectral reflectance is as shown in FIG. 12.

Incidentally, this is a result in the case in which a slit width is 0.05 m, a lifting distance of the mask from the substrate is 0.01 m, a length of the sawtooth is 0.0075 m, and a width of the sawtooth is 0.0003 m.

In the relation between the distance (X) and the film thickness, the film thickness sequentially increases as shown in FIG. 7. As a way of this change, in general, an inclination tends to be gentle as the slit width is increased, and a uniform density area tends to increase as the lifting distance is increased. It is possible to control a desired inclination state and a uniform density area according to the parameters of a sawtooth shape as shown in FIGS. 22A to 22C, a length 112 of the sawtooth, and a width 113 of the sawtooth in addition to the above two parameters, that is, five parameters in total.

Next, Comparative Example 2 which is a comparative example of Embodiment 1-c will be described.

COMPARATIVE EXAMPLE 2

This comparative example is different from Embodiment 1-a only in that a structure of an outermost layer is changed. In Embodiment 1-a, the layers other than the outermost layer were formed using the sawtooth/linear mask, whereas the outermost layer was formed in a constant thickness without using the sawtooth/linear mask. On the other hand, in this comparative example, all layers were formed using the sawtooth/linear mask.

Figure 6:
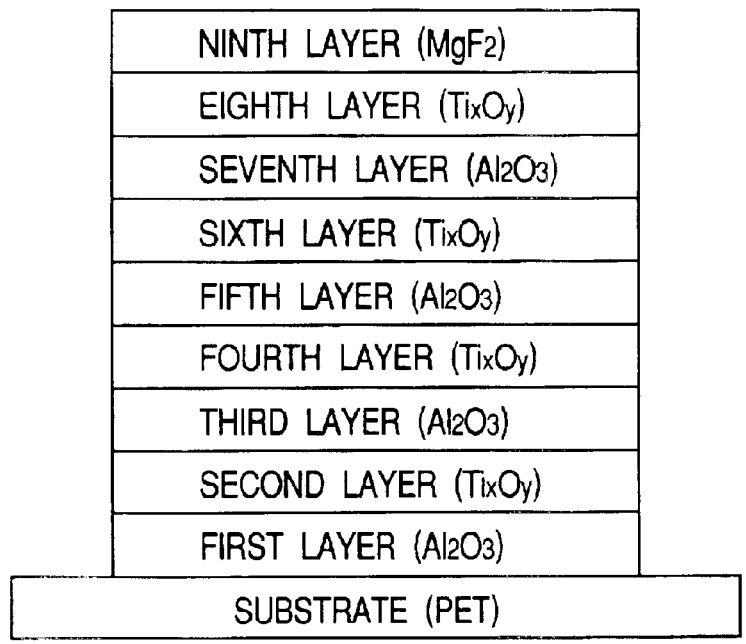
FIG. 6 is a table showing a film structure of an evaporation ND filter for illustrating an embodiment mode, an embodiment, and the like of the present invention.

As in Embodiment 1-c, first layer to ninth layers with the film structure shown in FIG. 6 were formed by the vacuum evaporation method on the PET substrate with a thickness of 75 μm.

The outermost layer film was formed ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

The sawtooth/linear mask is arranged as shown in FIG. 22A.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

As described above, after the film formation from the first layer to the outermost layer, heat treatment was performed at a temperature of 110° C. in the atmosphere for one hour. The reason for selecting the temperature of 110° C. is the same as that in the above-mentioned embodiment.

In addition, in order to investigate environmental stability, a shelf test under conditions of 60° C., 85%, and 240 hours was performed for the plastic ND filter. Then, a result same as that in the above-mentioned embodiment was obtained.

Further, as to a film thickness distribution, a result substantially equal to a result of a simulation was obtained as shown in FIG. 23A.

In this comparative example, a relation between a distance (X) and a film thickness was as shown in FIG. 13. In addition, a relation between a distance and a transmittance and a relation between the distance and a reflectance at this point were as shown in FIGS. 9 and 15, respectively.

In addition, a spectral transmittance and a spectral reflectance were as shown in FIGS. 11 and 17, respectively.

Incidentally, this result is for the case in which a slit width is 0.05 m, a lifting distance of the mask from the substrate is 0.01 m, a length of the sawtooth is 0.0075 m, and a width of the sawtooth is 0.0003 m.

As in this comparative example, when film thicknesses of all the layers are changed, conditions for preventing reflection are not met, increase in a reflectance is caused, and a "ghost phenomenon" or "flare phenomenon" occurs in terms of image quality.

Next, Embodiment 2 will be described.

<Embodiment 2>

In manufacturing a gradation ND filter of this embodiment, a film forming method according to the vacuum film forming method such as the evaporation method or the sputtering method, the ink jet printing method, the spray method, or the like is used. As a procedure for the method, first, in order to form a density change pattern in the ND filter, a dotted mask is set between a film formation source (evaporation source, ink jet head, or spray gun) and a plastic substrate of the ND filter to form a first later to a layer immediately below an outermost layer. Thereafter, the outermost layer is formed without setting the dotted mask. According to such a process, it becomes possible to manufacture an ND filter of a density variable type (gradation type) which is capable of coping with high image quality.

More specifically, for example, the vacuum evaporation method is used as a film forming method, and a dotted mask, which is formed such that a hole diameter of a dotted pattern and a distance between centers of holes are changed stepwise or continuously, is set on a plastic substrate lifted in a range of 1 mm to 50 mm from the plastic substrate to form a film with a film thickness thereof changing stepwise or continuously from the first layer to a layer immediately below the outermost layer using at least two kinds of films.

Figure 27:
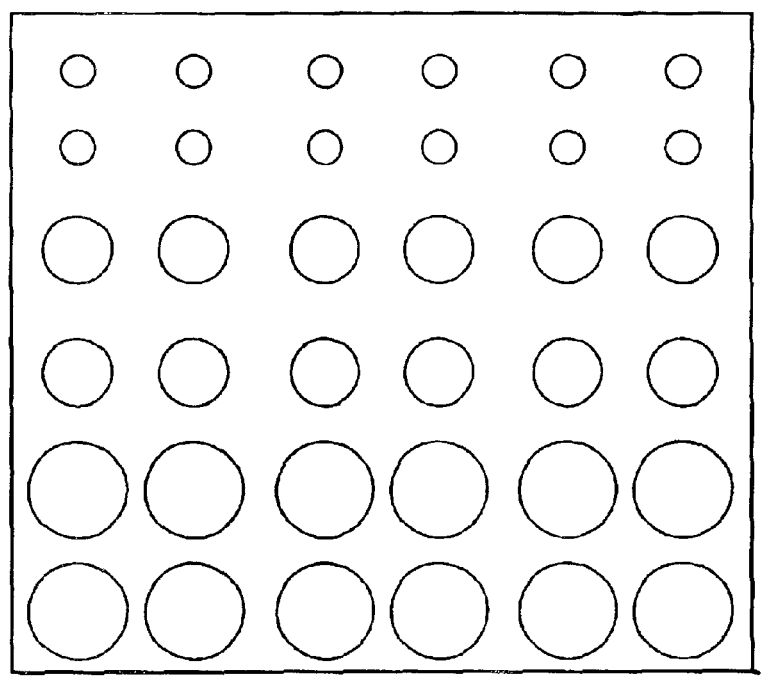
FIG. 27 is a diagram showing a dotted mask, in which a size of a hole is changed stepwise, used for the embodiment of the present invention.
Figure 28:
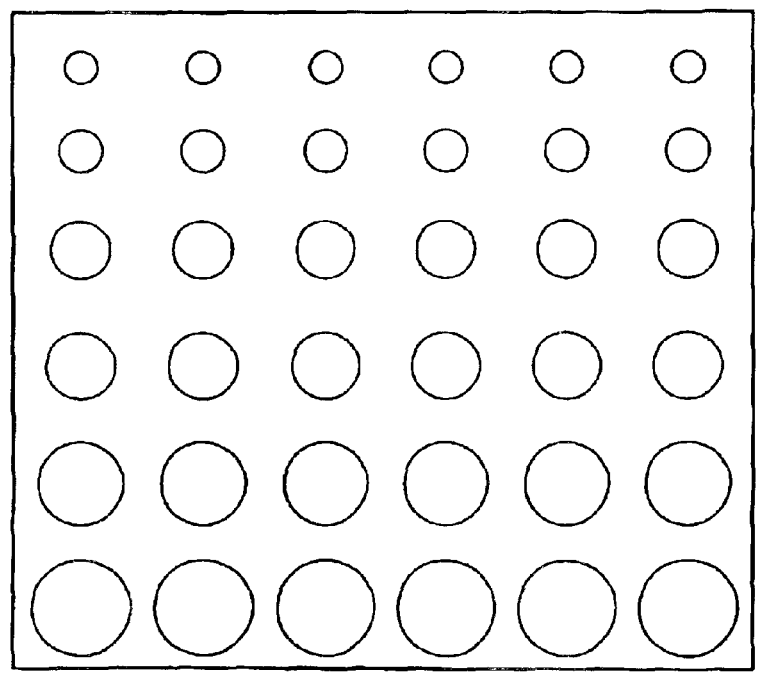
FIG. 28 is a diagram showing a dotted mask, in which a size of a hole is changed stepwise, used for the embodiment of the present invention.

For example, in the case in which the vacuum evaporation method is used, a mask in which a hole diameter of a dotted pattern and a distance between centers of holes are changed stepwise or continuously as shown in FIG. 27 or 28 is provided on a film forming side of the substrate, whereby a film with a varying film thickness distribution is formed on the substrate based upon these positional relations and the like.

Such a change of a film thickness distribution varies depending upon a mask shape such as a hole diameter of a dotted pattern and a distance between centers of holes being changed stepwise or continuously, a distance between the substrate and the mask, or the like. Therefore, by adjusting the hole diameter of the dotted pattern and the distance between centers of holes in the mask, the distance between the substrate and the mask, or the like, it becomes possible to form a film having an arbitrary film thickness distribution on the substrate. Here, an increase in a film thickness means an increase in a density of the film and a decrease in a transmittance. Therefore, obtaining an arbitrary film thickness distribution means, in other words, that an arbitrary gradation density distribution can be obtained, which is an object of the present invention.

As described above, after forming the film with a thickness thereof changing stepwise or continuously, an outermost layer with a constant thickness with a refractive index n of 1.5 or less in the wavelength range in the visible range of the film is formed without using a dotted mask under conditions of ¼ λ (λ=500 nm to 600 nm) in an optical film thickness (n×d), whereby a reflection characteristic can also be improved.

The present invention will be hereinafter described in more detail using Embodiments 2-a, 2-b, and 2-c.

<Embodiment 2-a>

In Embodiment 2-a, first, the first layer to a layer immediately below the outermost layer in the film structure shown in FIG. 6 were formed as described below by the vacuum evaporation method on a plastic substrate 204 (hereinafter referred to as PET substrate) with a thickness of 75 μm.

Figure 29:
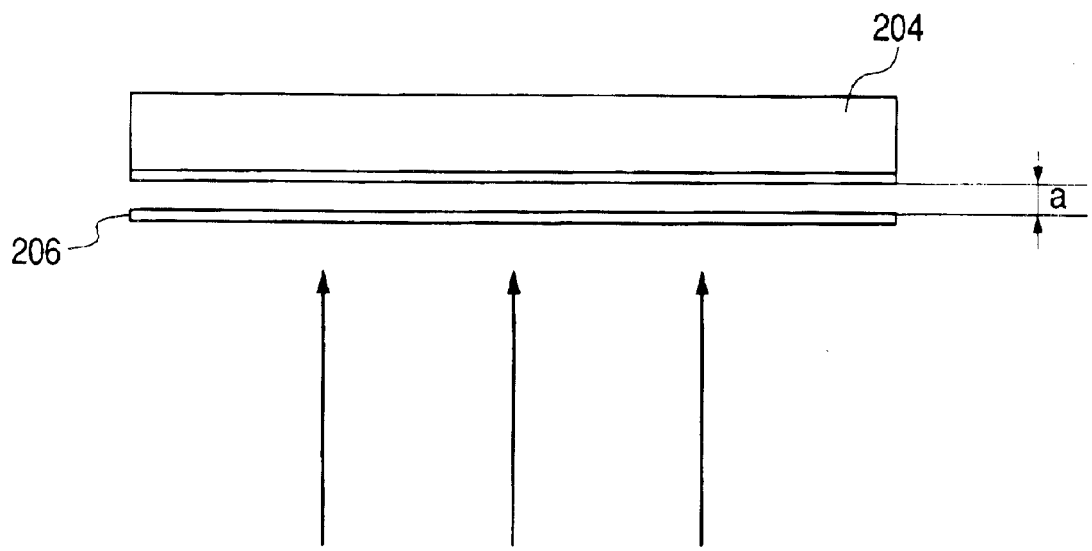
FIG. 29 is a schematic view of a setting method of a PET substrate and a mask for illustrating the embodiment of the present invention and a comparative example.

In this embodiment, the dotted mask shown in FIG. 27, in which a size of a hole was changed stepwise, was used as a dotted mask 206, which was set in a manner as shown in FIG. 29.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

In this case, the distance d between the PET substrate and the mask was set to 30 mm.

Next, the dotted mask was removed, and the outermost layer was formed with a constant film thickness under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, $MgF_2$ was used.

After the film formation from the first layer to the outermost layer as described above, heat treatment was performed at a temperature of 110° C. in the atmosphere for one hour. The temperature of 110° C. was selected because an effect of environmental stability is insufficient under a temperature of 100° C., and if a temperature exceeds 130° C., a problem occurs, for example, thermal deterioration of the substrate is caused and a crack is generated in the film. Therefore, as a temperature for heat treatment, a temperature between 110° C. and 130° C. is appropriate.

A density (D) and a transmittance (T) has a relation of $D=Log_{10}1/T=-Log_{10}T$. Here, the importance lies in the hole diameter of the dotted pattern, the distance between centers of holes, and the distance d between the PET substrate and the mask. Since a desired density pattern can be obtained according to the hole diameter of the dotted pattern and the distance between centers of holes, it is sufficient to select these as needed at any time.

In addition, as the distance d between the PET substrate and the mask, 1 mm to 50 mm is appropriate. If the distance d is smaller than 1 mm, a density pattern formed on the PET becomes a dotted manner, and there are formed parts of the PET substrate where having high density and where not being evaporated at all. Thus, improvement in image quality, which is an object of the present invention, cannot be attained. This is because, although a pattern in which a density gradually changes is desirable for improvement in image quality, parts with a large density difference are formed. On the other hand, in the case in which the distance d is larger than 50 mm, invasion of the film becomes large, a density pattern formed in the PET substrate of the mask is uniformalized, and satisfactory variation in density cannot be obtained.

In order to investigate environmental stability, a shelf test under conditions of 60° C., 85%, and 240 hours was performed for the plastic ND filter, and a transmittance was measured before and after the test, respectively. As a result, the difference was only 0.2% or less and almost no difference was observed. As a reference, when the same shelf test was performed for an ND filter not subjected to heat treatment and a transmittance before and after the test was measured, respectively, with a result of about 2% increase.

As a factor of such a phenomenon, there is given a fact that a substrate temperature at the time of vacuum evaporation is low. It is considered that a transmittance increases due to influences in that: sealing density of a film is largely affected by a substrate temperature at the time of film formation and, if the temperature is low, the sealing density falls, moisture, oxygen, and the like are easily transmitted and, thus, oxidation of $Ti_xO_y$ itself which is an absorption film is promoted; and a protection effect of a dielectric film such as $Al_2O_3$ film for protecting $Ti_xO_y$ is small. Improvement of the environmental stability by the heat treatment is considered to be based on an "aging effect".

A pattern as shown in FIG. 2A is formed on the plastic substrate in which a multi-layer film manufactured in this way is formed. Then, the plastic substrate is cut out in a substantially triangular shape to complete a gradation ND filter. In the case in which this gradation ND filter is applied to an aperture device, a gradation ND filter 1 is stuck to an aperture blade 2 of an aperture device as shown in FIG. 1 to realize a state of FIG. 1. The aperture device is the same as the one described with reference to FIG. 37 and is provided with a plurality of aperture blades which are relatively driven to change a size of an aperture. The gradation ND filter is formed as shown in FIG. 2B. 0 indicates an end surface portion, and areas X1, X2, and X3 extended therefrom are density change areas. A highest uniform density is formed in the areas from X3 to X4. The areas from X4 to X5 are adhesive areas for adhering the filter to the blades.

Figure 30:
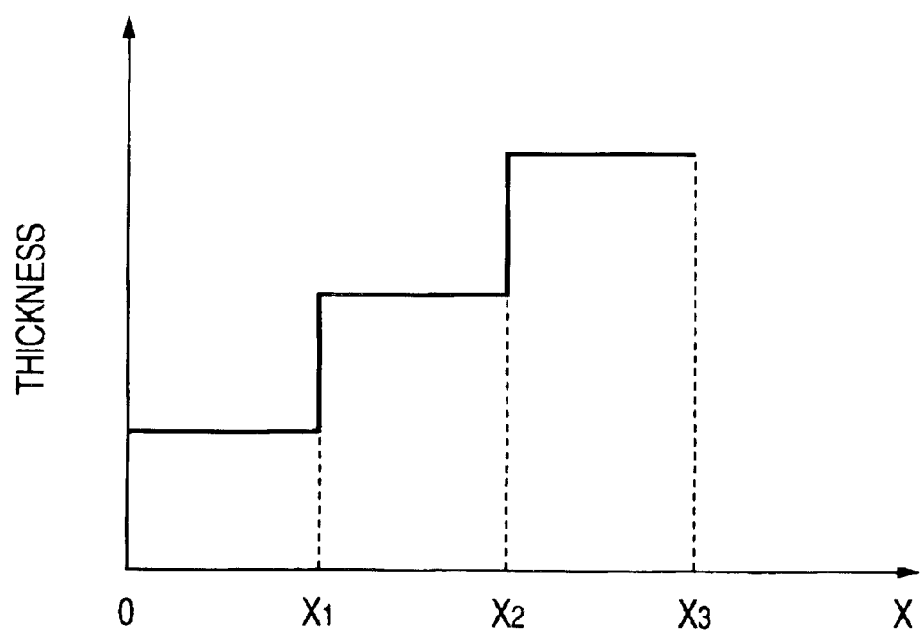
FIG. 30 is a film thickness change characteristic graph in accordance with the embodiment of the present invention.

In this embodiment, a relation between a distance (X) and a film thickness in the first layer to the eighth layer and a relation between the distance (X) and a film thickness of the ninth layer (outermost layer) are as shown in FIGS. 30 and 8.

Figure 31:
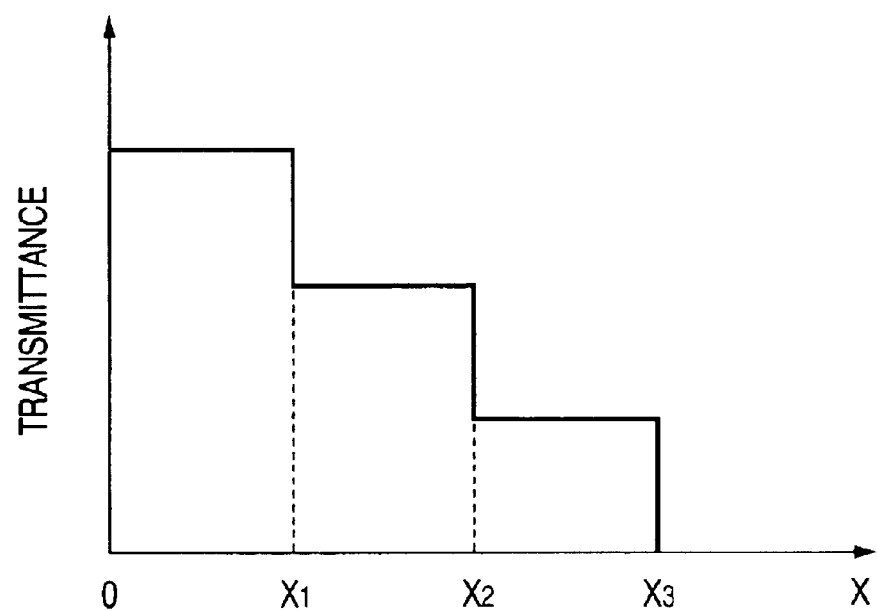
FIG. 31 is a transmittance characteristic graph in accordance with the embodiment of the present invention.
Figure 32:
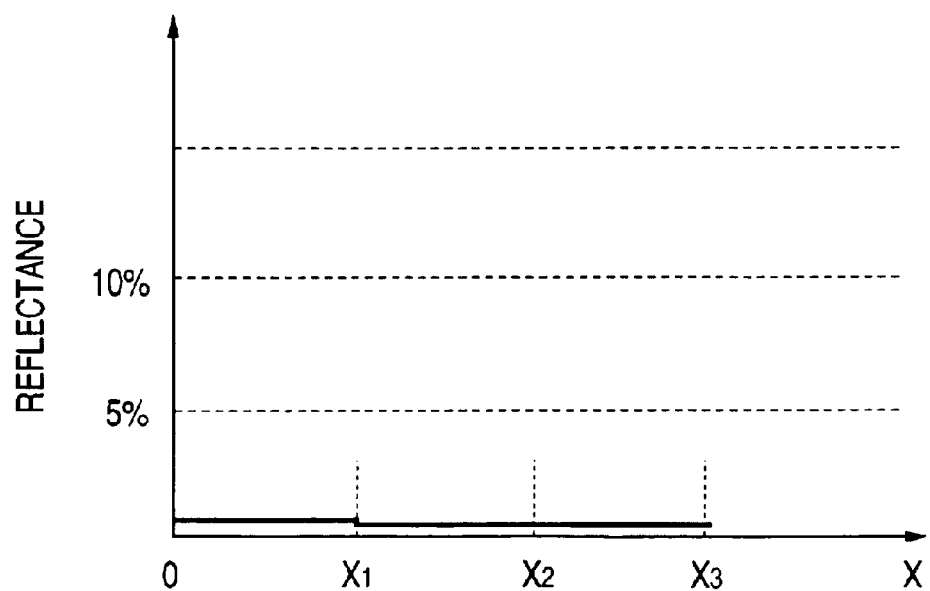
FIG. 32 is a reflectance characteristic graph in accordance with the embodiment of the present invention.

In addition, a relation between the distance (X) and a transmittance and a relation between the distance (X) and a reflectance are as shown in FIGS. 31 and 32.

Moreover, a spectral transmittance was as shown in FIG. 11, and a spectral reflectance was as shown in FIGS. 23A to 23C-2.

Embodiment 2-b will be hereinafter described.

<Embodiment 2-b>

In Embodiment 2-b, first, the first layer to a layer immediately below the outermost layer in the film structure shown in FIG. 7 were formed as described below by the vacuum evaporation method on the PET substrate with a thickness of 75 μm.

In this embodiment, the dotted mask shown in FIG. 28, in which a size of a hole was changed continuously, was used as a dotted mask, which was set in a manner as shown in FIG. 29.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

In that case, the distance d between the PET substrate and the mask was set to 30 mm.

Next, the dotted mask was removed, and the outermost layer was formed under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, MgF$_2$ was used.

After the film formation from the first layer to the outermost layer as described above, heat treatment was performed at a temperature of 110° C. in the atmosphere for one hour. The reason for selecting the temperature of 110° C. was the same was as that of Embodiment 1.

The following conditions are also same as those of Embodiment 1. Since a desired density pattern can be obtained according to the hole diameter of the dotted pattern and the distance between centers of holes, it is sufficient to select these as needed at any time. As the distance d between the PET substrate and the mask, 1 mm to 50 mm is appropriate.

Further, in order to investigate environmental stability, a shelf test under conditions of 60° C., 85%, and 240 hours was performed for the plastic ND filter in the same manner as in Embodiment 1, and results that are similar to those of Embodiment 1 were obtained.

A pattern as shown in FIG. 2A is formed on the plastic substrate, in which a multi-layer film thus manufactured is formed. Then, the plastic substrate is cut out in a substantially triangular shape to complete a gradation ND filter. In the case in which this gradation ND filter is applied to an aperture device, a gradation ND filter 1 is stuck to an aperture blade 2 of an aperture device as shown in FIG. 1 to realize a state of FIG. 1. The aperture device is the same as the one described with reference to FIG. 37 and is provided with a plurality of aperture blades which are relatively driven to change a size of an aperture. The gradation ND filter is formed as shown in FIG. 2B. 0 indicates an end surface portion, and areas X1, X2, and X3 extending therefrom are density change areas. A highest uniform density is formed in the areas from X3 to X4. The areas from X4 to X5 are adhesive areas for adhering the filter to the blades.

In this embodiment, a relation between a distance (X) and a film thickness in the first layer to the eighth layer and a relation between the distance (X) and a film thickness of the ninth layer (outermost layer) are as shown in FIGS. 7 and 8.

In addition, a relation between the distance (X) and a transmittance and a relation between the distance (X) and a reflectance are as shown in FIGS. 9 and 10.

Moreover, a spectral transmittance is as shown in FIG. 11, and a spectral reflectance is as shown in FIGS. 23A to 23C-2.

Embodiment 2-c will be hereinafter described.
<Embodiment 2-c>

In Embodiment 2-c, first, the first layer to a layer immediately below the outermost layer in the film structure shown in FIG. 7 were formed as described below by the vacuum evaporation method on a PET substrate with a thickness of 75 µm.

In this embodiment, the dotted mask shown in FIG. 28, in which a size of a hole was changed continuously, was used, which was set in a manner as shown in FIG. 29.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

In this case, the distance d between the PET substrate and the mask was set to 30 mm.

Next, the dotted mask was removed, and the outermost layer was formed under the condition of ¼ λ (λ: 540 nm) in an optical film thickness n×d (n is a refractive index and d is a mechanical film thickness). As a film for this outermost layer, a film with the refractive index n of 1.5 or less in the wavelength range in the visible range was selected. More specifically, MgF$_2$ was used.

In this embodiment, heat treatment in the atmosphere after the evaporation in Embodiments 2-a and 2-b was not performed.

In order to examine environmental stability, a shelf test under conditions of 60° C., 85%, and 240 hours was performed for the plastic ND filter, and a transmittance was measured before and after the test, respectively. The transmittance was increased by about 1.0% to 3.0%.

As a reason for the transmittance difference being large between before and after the test, it is conceivable that a substrate temperature at the time of vacuum evaporation is low. It is considered that a transmittance increases due to influences in that: sealing density of a film is largely affected by a substrate temperature at the time of film formation and, if the temperature is low, the sealing density falls, moisture, oxygen, and the like are easily transmitted and, thus, oxidation of Ti$_x$O$_y$ itself which is an absorption film is promoted; and a protection effect of a dielectric film such as Al$_2$O$_3$ film for protecting Ti$_x$O$_y$ is small.

Usually, in the case in which a glass substrate is used, a film is formed after heating the glass substrate to a substrate temperature of 200° C. to 250° C., desirably around 300° C.

However, in the case in which a substrate is made of plastics as in this case, it is necessary to form a film at a temperature at which the substrate does not cause heat shrinkage, and a substrate temperature therefor is restricted to less than 150° C.

In this embodiment, a relation between a distance (X) and a film thickness in the first layer to the eighth layer and a relation between the distance (X) and a film thickness of the ninth layer (outermost layer) are as shown in FIGS. 7 and 8.

In addition, a relation between the distance (X) and a transmittance and a relation between the distance (X) and a reflectance are as shown in FIGS. 9 and 10.

Moreover, a spectral transmittance is as shown in FIG. 11, and a spectral reflectance is as shown in FIGS. 23A to 23C-2.

Next, Comparative Examples 3 and 4 which are comparative examples of Embodiments 2-a, 2-b, and 2-c will be described.

COMPARATIVE EXAMPLE 3

In Comparative Example 1, the film structure shown in FIG. 6 was formed on the PET substrate with a thickness of 75 µm as described below by changing stepwise each film thickness of all the layers from the first layer to the outermost layer, which is the ninth layer.

In this comparative example, the dotted mask shown in FIG. 27, in which a size of a hole was changed stepwise, was used as a dotted mask, which was set in a manner as shown in FIG. 29.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

In this case, the distance d between the PET substrate and the mask was set to 30 mm.

Figure 33:
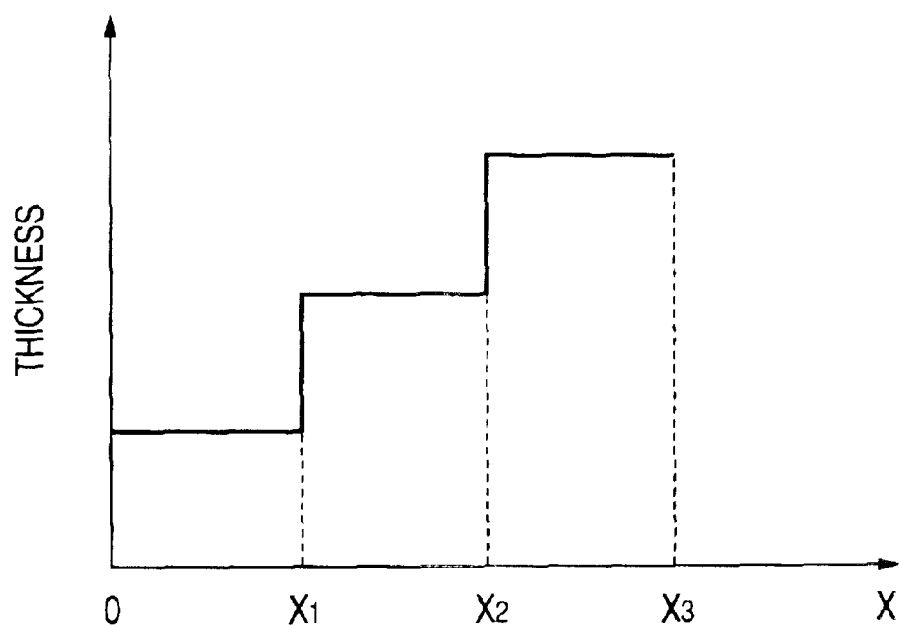
FIG. 33 is a film thickness change characteristic graph in the comparative example.

In this comparative example, a relation between a distance (X) and a film thickness in the first layer to eighth layers and the ninth layer (outermost layer) was as shown in FIG. 33. As shown in FIG. 33, if each film thickness of the layers including the outermost layer is changed stepwise, increase in a reflectance is caused, and "ghost" and "flare" phenomena occur as deterioration of image quality.

Figure 34:
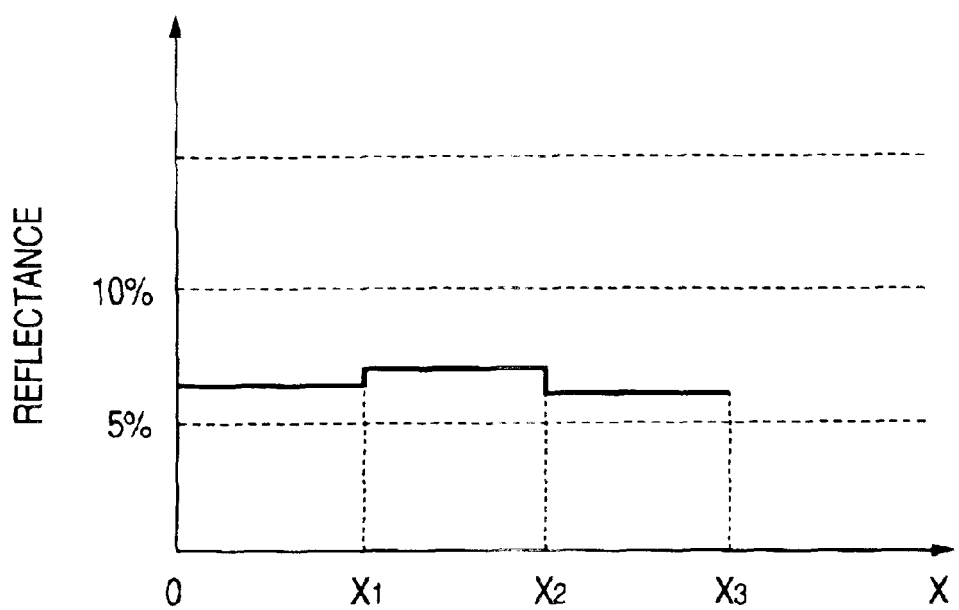
FIG. 34 is a reflectance characteristic graph in the comparative example.

In addition, a relation between the distance (X) and a transmittance and a relation between the distance (X) and a reflectance were as shown in FIGS. 31 and 34.

Figure 35:
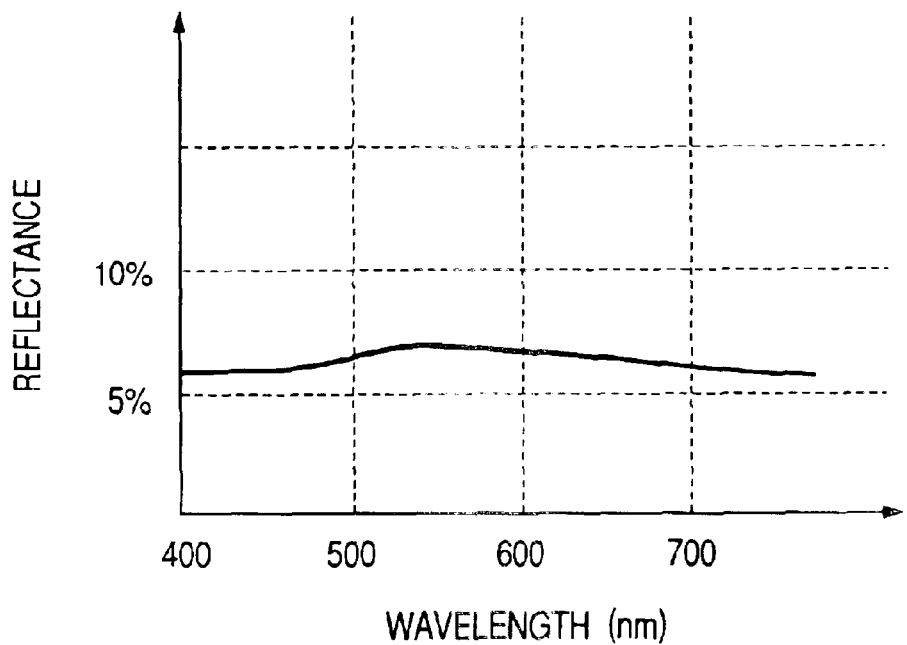
FIG. 35 is a graph showing a spectral reflectance in the comparative example.

Moreover, a spectral transmittance was as shown in FIG. 11, and a spectral reflectance was as shown in FIG. 35.

COMPARATIVE EXAMPLE 4

In Comparative Example 4, the film structure shown in FIG. 7 was formed on the PET substrate with a thickness of 75 μm as described below by changing stepwise each film thickness of all the layers from the first layer to the outermost layer, which is the ninth layer.

In this comparative example, the dotted mask shown in FIG. 27, in which a size of a hole was changed stepwise, was used as a dotted mask, which was set in a manner as shown in FIG. 29.

In addition, as a film forming method, the vacuum evaporation method was selected because a film thickness can be controlled relatively easily and diffusion in a wavelength range in a visible range is extremely small.

Further, as the substrate, PET was selected, which is high in heat resistance (glass transition point Tg), high in transparency in a wavelength range in a visible range, and low in water absorption.

In this case, the distance d between the PET substrate and the mask was set to 30 mm.

In this comparative example, a relation between a distance (X) and a film thickness in the first layer to eighth layers and the ninth layer (outermost layer) was as shown in FIG. 13. As shown in FIG. 11, if each film thickness of the layers including the outermost layer is changed stepwise, increase in a reflectance is caused, and "ghost" and "flare" phenomena occur as deterioration of image quality.

Figure 36:
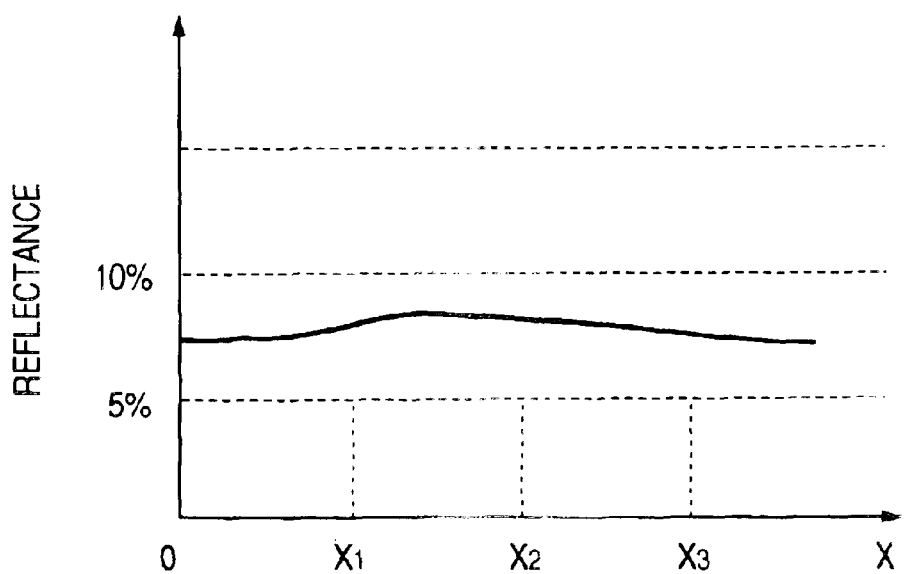
FIG. 36 is a reflectance characteristic graph in the comparative example.

In addition, a relation between the distance (X) and a transmittance and a relation between the distance (X) and a reflectance were as shown in FIGS. 9 and 36.

Moreover, a spectral transmittance was as shown in FIG. 11, and a spectral reflectance was as shown in FIG. 17.

As described above, a film thickness is changed stepwise or continuously from the first layer to a layer immediately below the outermost layer, a film with a refractive index n of 1.5 or less in the wavelength range in the visible range was used only for the outermost layer, and a film thickness thereof is set to a constant value of ¼ λ (λ=500 nm to 600 nm in an optical film thickness), whereby it becomes possible to decrease a reflectance.

Usually, assuming that a used wavelength is λ, a condition for preventing reflection of a single layer is ¼ λ in an optical film thickness. A reflectance decreases as a refractive index n of a film is smaller.

In this case, in the case in which the respective film thicknesses from the first layer to a layer immediately below the outermost layer change stepwise or continuously, a most suitable film thickness of the outermost layer is ¼ λ (λ=500 nm to 600 nm) in an optical film thickness n×d. When a film thickness deviates from this range, a reflectance increases.

The present invention has been described using the embodiments. According to the embodiments, there are realized a method of manufacturing a low-cost ND filter which does not cause deterioration of image quality due to diffusion of light, and which has a gradation density distribution, with which high image quality can be coped with the ND filter, and an aperture device and a camera which have the ND filter and can realize improvement in uniformity of light amount.

What is claimed is:

1. A method of manufacturing an ND filter having at least two kinds of films on a substrate, comprising the steps of:
   forming a film of at least one layer having a gradation thickness distribution while rotating a mask integrally with the substrate;
   forming a film of an outermost layer without using the mask on the film of at least one layer having a gradation thickness distribution; and
   subjecting the substrate after film formation to heat treatment in an atmosphere pressure and at a temperature of 100° C. to 130° C.

2. A method according to claim 1, wherein the step of forming the film of the outermost layer is a step of forming a film with a constant film thickness.

3. A method according to claim 2, wherein the step of forming the film of the outermost layer is a step of forming a film with an optical film thickness n×d (n: refractive index of film, d: mechanical film thickness) of λ/4 (λ: wavelength of incident light).

4. A method according to claim 1, wherein the step of forming the film of at least one layer having a gradation thickness distribution comprises the sub-steps of:
   forming a film of a first layer having a gradation thickness distribution while rotating a first mask integrally with the substrate; and
   forming a film of a second layer to the layer immediately below the outermost layer having a gradation thickness distribution in an opposite direction from the first layer while rotating a second mask shifted from the first mask integrally with the substrate.

5. A method according to claim 1, wherein the mask has a sawtooth shape.

6. A method according to claim 1, wherein the mask is a mask having a dotted pattern.

7. A method according to claim 6, wherein the diameter of the dots change stepwise or continuously.

8. A method according to claim 6, wherein a distance between centers of dots change stepwise or continuously.

9. A method according to claim 6, wherein the mask having the dotted pattern is used with a distance between the mask and the substrate set to a value in a range of 1 mm to 50 mm.

10. An aperture device comprising:
    an ND filter; and
    a plurality of aperture blades including an aperture blade to which said ND filter is fixed, and plurality of aperture blades relatively driven to change a size of an aperture;
    wherein said ND filter comprises:
      a substrate,
      a film of at least one layer which is formed on the substrate and has a gradation thickness distribution, and
      a film of an outermost layer which is formed on the film having the gradation thickness distribution.

11. A camera comprising:
    an optical system; and
    an aperture device according to claim 10 which restricts an amount of light passing through the optical system.

12. An aperture device according to claim 10, wherein the film thickness of the outermost layer is constant.

* * * * *